United States Patent [19]

Zalesak et al.

[11] Patent Number: 4,468,760
[45] Date of Patent: Aug. 28, 1984

[54] DIRECTIONAL LINE-HYDROPHONE ARRAY CALIBRATOR

[75] Inventors: Joseph F. Zalesak, Altamonte Springs, Fla.; Peter H. Rogers, Potomac, Md.

[73] Assignee: The United States of America as represented by the Secretary of the Navy, Washington, D.C.

[21] Appl. No.: 393,246

[22] Filed: Jun. 29, 1982

[51] Int. Cl.³ .............................................. H04R 29/00
[52] U.S. Cl. ..................................... 367/13; 73/1 DV
[58] Field of Search ......................... 367/13; 73/1 DV

[56] References Cited

U.S. PATENT DOCUMENTS 3,859,620 1/1975 Percy ..................................... 367/13
3,864,664 2/1975 Trott et al. ............................ 367/13
4,205,394 5/1980 Pickens ................................. 367/13

Primary Examiner—Richard A. Farley
Attorney, Agent, or Firm—Robert F. Beers; William T. Ellis; Charles E. Krueger

[57] ABSTRACT

A calibrator for determining the directivity pattern and complex sensitivity of a line hydrophone array including a calibration chamber, filled with a selected fluid, for sealing the array therein. Projectors, for generating acoustic waves, and monitors, for measuring the amplitude and phase of acoustic waves incident thereon, are mounted within the chamber. The projectors and monitors are connected to a computerized control circuit that drives the projectors to generate a calibration wave, with a predetermined amplitude and phase relative to the center of the array, corresponding to a free plane wave incident at an angle $\theta$ to the axis of the chamber.

9 Claims, 6 Drawing Figures

DIRECTIONAL LINE-HYDROPHONE ARRAY CALIBRATOR

BACKGROUND OF THE INVENTION

The present invention relates to hydrophone calibrators in general and more particularly pertains to a calibrator for measuring the directivity pattern and sensitivity of a line-hydrophone array.

The utility of a hydrophone array is dependent on the accuracy with which it has been calibrated. Accurate determination of the directivity pattern and complex sensitivity of an array are required for the sophisticated demands of modern marine technology. The directivity pattern of an array is the dependence of the array output signal amplitude on the incident angle of an acoustic plane wave incident on the array. The complex sensitivity is the dependence of the amplitude and phase of the array output signal on the amplitude and phase of the incident acoustic plane wave at the center of the array. The complex sensitivity must be known as a function of frequency.

Heretofore, arrays have been calibrated in natural bodies of water or in calibration chambers. As the length of hydrophone arrays has increased it has become increasingly difficult to obtain free field conditions, necessary for directivity measurements in natural bodies of water. The long arrays are also impossible to fit in prior art calibration tanks without coiling or winding the array on an acoustically transparent drum. However, when the arrays are coiled or wound directivity measurements are precluded.

OBJECTS OF THE INVENTION

Accordingly, an object of the present invention is to provide a calibrator for measuring the directivity pattern and sensitivity of a long hydrophone array.

SUMMARY OF THE INVENTION

The above and other objects are attained in the present invention which includes a calibration chamber, filled with a selected fluid, for sealing the array therein. Projectors, for generating acoustic waves, and monitors, for generating output signals in response to acoustic waves incident thereon, are mounted within or along the chamber. The array and each monitor are connected to an analog-to-digital (A/D) channel while each projector is connected to digital-to-analog (D/A) channel. A computer interconnected to the A/D and D/A channels by an interface and control circuit is programmed to drive the projectors to generate a calibration wave, with a predetermined amplitude and phase relative to the center of the array, corresponding to a plane wave of a pre-determined angle of incidence. The computer then displays the directivity pattern or the sensitivity vs frequency pattern of the array. The complex sensitivity vs frequency curve can be generated for an arbitrary angle of incidence.

BRIEF DESCRIPTION OF THE DRAWINGS

A more complete appreciation of the invention and many of the attendent advatages thereof will be readily obtained as the same becomes better understood by reference to the following detailed description when considered in connection with the accompanying drawings, wherein.

DESCRIPTION OF THE PREFERRED EMBODIMENT

Figure 1:
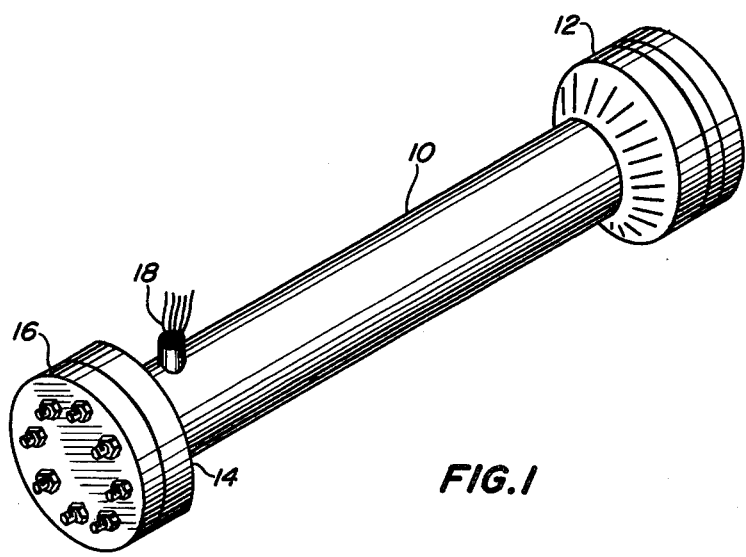
FIG. 1 is an external perspective view of the calibration chamber.
Figure 2:
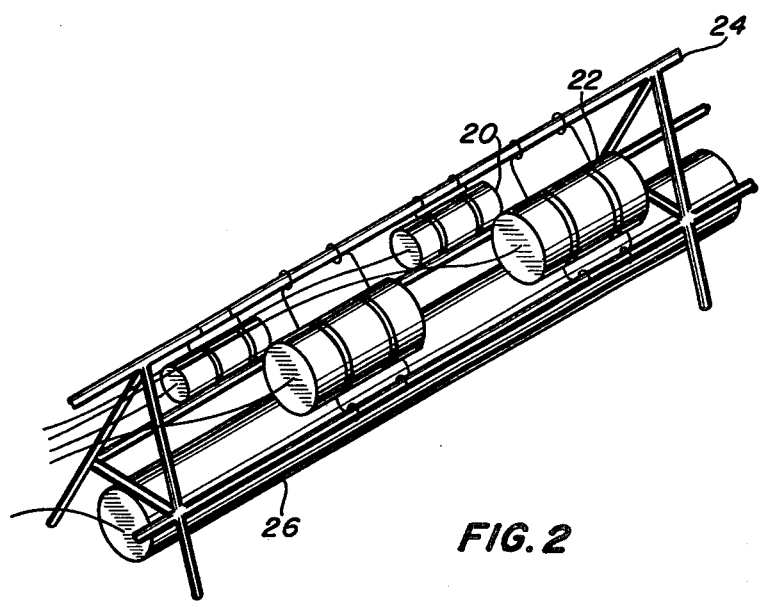
FIG. 2 is an internal perspective view of the calibration chamber.

One embodiment of the present invention comprises a sealed, water filled cylindrical chamber depicted in FIGS. 1 and 2 with acoustic projectors and monitor hydrophones mounted therein. The array to be calibrated is positioned within the chamber.

As described more fully below, the projectors can be driven to create a calibration wave, traveling axially within the chamber, that is equivalent to a free plane wave incident upon the array at a predetermined angle, $\theta$. The directivity pattern is measured by varying $\theta$ and displaying the dependence of the amplitude of the array output signal on $\theta$. The complex sensitivity may be similarly measured by driving the projectors to generate a calibration wave with some fixed angle of incidence $\theta$, and with some pre-determined amplitude and phase with respect to the center of the array and then varying the frequency of the wave.

Figure 5:
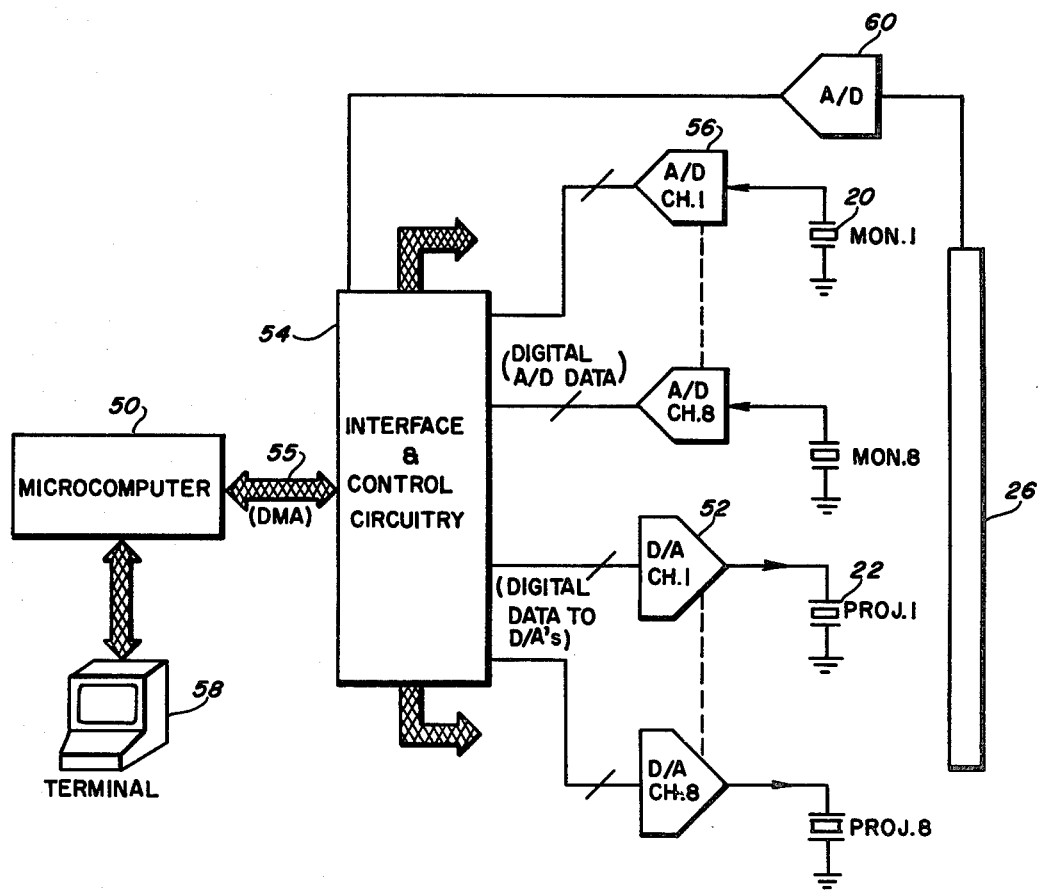
FIGS. 5 and 6 are schematic diagrams of the digital computerized control system interconnected with the projectors and monitors and hydrophone array in the calibration chamber.

The amplitudes and phases of the driving voltage signals for generating the correct calibration wave are determined by a digital computer, depicted in FIG. 5, interconnected with projectors and monitors within the calibration chamber by appropriate interface and control circuitry. The computer directs digital signals to digital-to-analog (D/A) channels so that the projectors are driven to generate the correct calibration wave.

Referring now to the drawings, wherein like reference numerals designate identical or corresponding parts throughout the several views, and more particularly to FIG. 1 thereof, an external view of the calibration chamber of the present invention is set forth. The calibration chamber 10, which may be a high pressure pipe, has flanges 12, 14 at each end. One end of the chamber 10 is closed by a removable end plate 16 so that equipment under test may be inserted and removed. The chamber 10 is fitted with a cable stuffing box 18 for providing electrical connections to components within the chamber 10. Means for filling the chamber 10 with water and pressurizing the water are also required but are well understood by persons in the art and are not depicted.

FIG. 2 is an internal view of a section of the calibration chamber set forth in FIG. 1. Monitor hydrophones 20 and acoustic projectors 22 are mounted on an acoustically transparent support structure 24. The support structure 24 is made of PVC pipe with holes drilled therein for allowing air to escape when the chamber 10 is filled with water. The monitor hydrophones 20 and acoustic projectors 22 are mounted to the support structure 24 by vibration isolation mounts made out coils of thin stainless steel cables strapped to the monitor hydrophones and projectors by nylon cable ties and strapped to the support structure with stainless steel bands. Vibration isolation mounts prevent vibrations from being transmitted to and from the monitor 20 and projectors 22 and yet maintain the relative positions of the monitor 20 and projectors 22 even when water is rapidly flowing through the calibration chamber 10, such as when the water in the chamber 10 is being circulated to remove the air from within the chamber. The hydrophone array 26 to be calibrated is placed on the bottom of the calibration chamber 10 between the legs of the support structure 24.

The description of the operation of the present invention is facilitated by the brief description of the physical principles underlying its operation. To this end attention is called to FIG. 3 where a line hydrophone array 26 is depicted with two acoustic plane waves 30, 32, of equal frequency and amplitude, incident thereon. The first wave has a propagation vector 34 parallel to the array axis and is designated the axial wave 30 while the second wave 32 has a propagation vector 36 forming an angle $\theta$ with the array axis. The vertical lines 38 perpendicular to the propagation vectors 34, 36 denote planes of constant complex amplitude and phase of the respective acoustic plane waves where the distance between the wave fronts 38 is the wavelength. Note that the distance between the points where the wavefronts 34 of the second wave 32 intersect array is $$\lambda_\theta = \lambda / \cos \theta \tag{1}$$

Thus, the wave incident at angle $\theta$ appears to have a longer wavelength than the axial wave 30. Since the velocity of propagation is determined by:

$$v = \lambda f \tag{2}$$

increasing the wavelength increases the velocity. If v is the free velocity of the axial wave in the selected fluid then the apparent velocity of the second wave is:

$$v_\theta = \lambda_\theta f = \lambda f / \cos \theta = v / \cos \theta \tag{3}$$

Since $\cos \leq 1$ $v_\theta \geq v$. The actual velocity of propagation in the chamber 10, $v_c$, is less than v so that:

$$v_c = Cv \tag{4}$$

where C is a constant equal to $v_c/v$ and $C<1$.

Thus, a calibration wave in the chamber would correspond to a free plane wave incident at $\theta$ if the wavelength of calibration wave, $\lambda_c$, could be adjusted so the apparent velocity of the calibration wave 44 were $v_\theta$. If $$\lambda_c = V_c / C \cdot f \cdot \cos \theta \tag{5}$$

then:

$$v_{apparent} = \lambda_c f = V_\theta \tag{6}$$

Thus, by adjusting $\lambda_c$ the calibration wave is made to correspond to free plane waves incident at $\theta$.

Additionally, the invention utilizes the principle of linearity, i.e., that the acoustic disturbance measured at a point with several acoustic waves incident thereon is the sum of the acoustic disturbance produced by each of the individiual acoustic waves. One adjunct of the principle of linearity is that a wave which is the sum of any number of waves of frequency f will itself be of frequency f.

The operation of the present invention will now be described with reference to FIG. 4, a schematic diagram of section of the calibration chamber depicted in FIGS. 1 and 2, and FIG. 5, a schematic diagram depicting a computerized control circuit interconnected with the calibration chamber depicted in FIG. 4.

Figure 4:
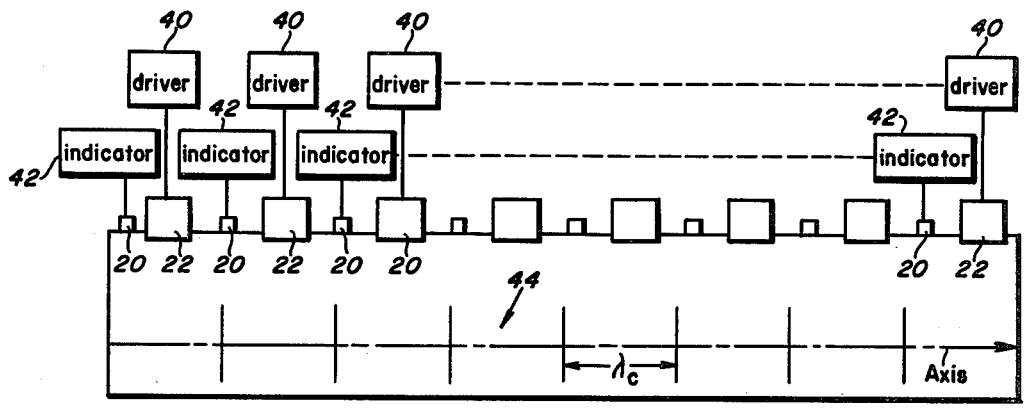
FIG. 4 is a schematic diagram of a section of the calibration chamber.

Turning now to FIG. 4, each projector 22 is driven by a voltage driving signal supplied by a driver 40. The driving voltage signal supplied to the jth projector is a periodic signal at frequency f with a complex amplitude $V_j$. The complex amplitude, $V_j$, may be expressed as $Ae^{i\phi}$ where A is a real number corresponding to the peak-to-peak amplitude of jth driving voltage signal and $\phi$ is the relative phase of the jth driving signal with respect to an arbitrary reference. The projector will generate an acoustic plane wave in the chamber 10 at frequency f and at some complex amplitude. Each projector may be adjusted to control the complex amplitude of its driving voltage signal.

The complex amplitude of each monitor output signal is measured by an indicator 42 connected to the monitor 20. If an acoustic wave incident on the ith monitor has complex amplitude, $P_i$, then the complex amplitude of the ith monitor output signal is proportional to $P_i$ with a known proportionality constant (i.e. the sensitivity of the hydrophone).

The complex amplitude of the signal from the jth projector measured at any point in the chamber is a complex constant times $V_j$. That is:

$$P_i = A_{ij} V_j \tag{7}$$

where $P_i$ is the complex amplitude of the wave from the jth projector measured by the ith monitor.

For purposes of illustration eight monitors 20 and eight projectors 22 are depicted in FIG. 4. If each projector is driven by a driving voltage with frequency f and complex amplitude $V_j$ then the acoustic waves generated will sum to form a calibration wave 44 propagating axially in the chamber. The complex amplitude and phase $P_1$, of the first monitor output signal generated in response to the calibration wave is the sum of complex amplitudes and phases generated in response to each wave generated by each projector:

$$P_1 = A_{11}V_1 + A_{12}V_2 + \ldots + A_{18}V_8 \tag{8}$$

Eq. 8 is a mathematical expression of the principle of linearity. Thus the $P_i$s generated in response to a calibration wave 44 generated when the projectors 22 are driven by driving voltages with arbitrary $V_j$s are uniquely determined by the set of equations:

$$\begin{aligned} P_1 &= A_{11}V_1 + A_{12}V_2 + \ldots + A_{18}V_8 \\ P_2 &= A_{21}V_1 + \phantom{A_{12}V_2 + \ldots\ } + A_{28}V_8 \\ &\phantom{=}\vdots \\ P_7 &= A_{71}V_1 + \phantom{A_{12}V_2\ } \ldots \phantom{\ } + A_{88}V_{78} \end{aligned} \tag{9}$$

The $A_{ij}$s in eq. (3) are the elements of a complex matrix, A, for determing the $P_i$s as a function of the $V_j$s or:

$$P = AV \tag{10}$$

where $P = (P_1, P_2 \text{ - - - } P_8)$ and $V = (V_1, V_2 \text{ - - - } V_8)$.

The $A_{ij}$s are determined by sequentially driving each projector at $V_j$, measuring the $P_i$s at each monitor and utilizing eq. (1) to calculate the $A_{ij}$s.

If the matrix A is inverted to obtain $A^{-1}$ then the $V_j$s required to produce a calibration wave with predetermined amplitude and phase at the monitors, $P_i$, are calculated using:

$$V = A^{-1} P. \qquad (11)$$

The following steps are followed to simulate a free plane wave incident at $\theta$. First, utilize eq. (5) to calculate $\lambda_c$. Second, determine the $P_i$s of a calibration wave with wavelength $\lambda_c$. Third, apply $A^{-1}$ to the $P_i$s to determine the $V_j$s for generating the calibration wave with wavelength $\lambda_c$. Finally, adjust the complex amplitude and phase of the jth driving voltage signal to equal $V_j$ for all j.

In practice, the adjustment of $\lambda_c$ is accomplished with the aid of the computerized control circuit depicted in FIG. 5.

Turning now to FIG. 5, the computer 50 is programmed to generate a digital signal and to sequentially direct the digital signal to each of the D/A channels 54 via the interface and control circuitry (ICC)54. The ICC54 utilizes a direct-memory-access (DMA) interface 55 in the computer to alternately read from and write to the computer memory. The D/A channel 52 converts the digital signal to a driving voltage signal, with amplitude and phase controlled by the digital signal, that drives the projector connected to the D/A channel 52. As each projector is sequentially driven the frequency, amplitude and phase of each monitor output signal, generated in response to the acoustic wave of the projector, is encoded in a digital signal by the A/D channel 56 and stored in the computer memory.

Each A/D channel 56 includes a preamp for amplifying the monitor output signal, a filter for eliminating high frequency noise, a sample and hold circuit for acquiring and holding the input from the filter, and an A/D converter for providing a monitor digital signal with the complex amplitude and phase of the monitor output signal encoded therein.

Each D/A channel 52 includes a D/A convertor for receiving a projector digital signal and generating a periodic convertor voltage signal with frequency, amplitude and phase determined by information encoded in a digital signal generated by the computer 50 and also includes a preamplifier to amplify the convertor output signal to a level sufficient to drive the projectors.

When all the projector 22 have been sequentially driven and the corresponding amplitudes and phases of the monitor output signals stored, the computer 50 calculates the elements of the matrix A, as described above, and inverts A to obtain $A^{-1}$.

The computer 50 then selects a value of $\theta$ stored in memory and calculates the wavelength, $\lambda_c$, of a calibration wave 44 needed to simulate a free plane wave incident upon the array at $\theta$. Next, the computer 50 determines the $P_i$s of a calibration wave with wavelength $\lambda_c$. The computer then applies $A^{-1}$ to the $P_i$s to calculate the amplitudes and phases of a set of driving voltage signals, $V_j$ for driving the projectors 22 to produce the correct calibration wave 44. A digital signal representing the amplitude and phase of each $V_j$ is then directed by the interface and control circuit 54 to the D/A channel 52 connected to the jth projector 20. The D/A channel 52 then generates driving voltage signals, with amplitudes and phases controlled by the digital signals from the computer 50, so that the acoustic waves generated by the projectors 20 sum to form a calibration wave 44 of wavelength $\lambda_c$ and apparent velocity $v_\theta$.

The frequency, amplitude and phase of the array output signal generated in response to each calibration wave is converted to a digital signal by an array A/D channel 60 interconnecting the array to the interface and control circuitry 54, and stored in the computer memory. After the computer 50 has completed generating calibration waves for a set of predetermined values of $\theta$, the dependence of the amplitude of the array output signal on $\theta$ is displayed on a terminal screen 58.

Thus, the present invention provides for the efficient measurement of the directivity pattern of the array. The computer may be programmed to generate calibration waves for a pre-determined set of incident angles, as described above, or the operator may select the angles. Similarly the frequencies of the calibration wave may be pre-determined or operator selected.

The sensitivity pattern is similarly measured. The computer 50 utilizes $A^{-1}$ to generate calibration waves 44 with a pre-determined amplitude and phase at a reference point on the array. The dependence of the complex amplitude and phase of the array output signal on the complex amplitude and phase of the calibration wave as a function of frequency is displayed by the computer.

Alternatively, if more monitors than projectors were employed the computer 50 is programmed to calculate the $V_j$s by a least squares fitting technique.

In an actual computer control circuit constructed, a PDP 11/23 microcomputer with a DRV 11-B DMA interface Card was employed. All D/A channels were identical and utilized a Datel model HK12BGC integrated circuit D/A converter and either a Burr-Brown 3583JM or a 3572AM Power amplifier, the former for high voltage low current applications and the former for large current low voltage applications. Each of the A/D channels utilized a noninverting preamp with 50 dB gain and 5MΩ input impedance, a Frequency Device model 746LT-3 low pass filer, a Datel model SHM-IC-1 integrated circuit sample and hold circuit and a Burr-Brown model ADC80AG-12 A/D convertor. The projectors and monitors were identical piezoelectric transducers.

Figure 6:
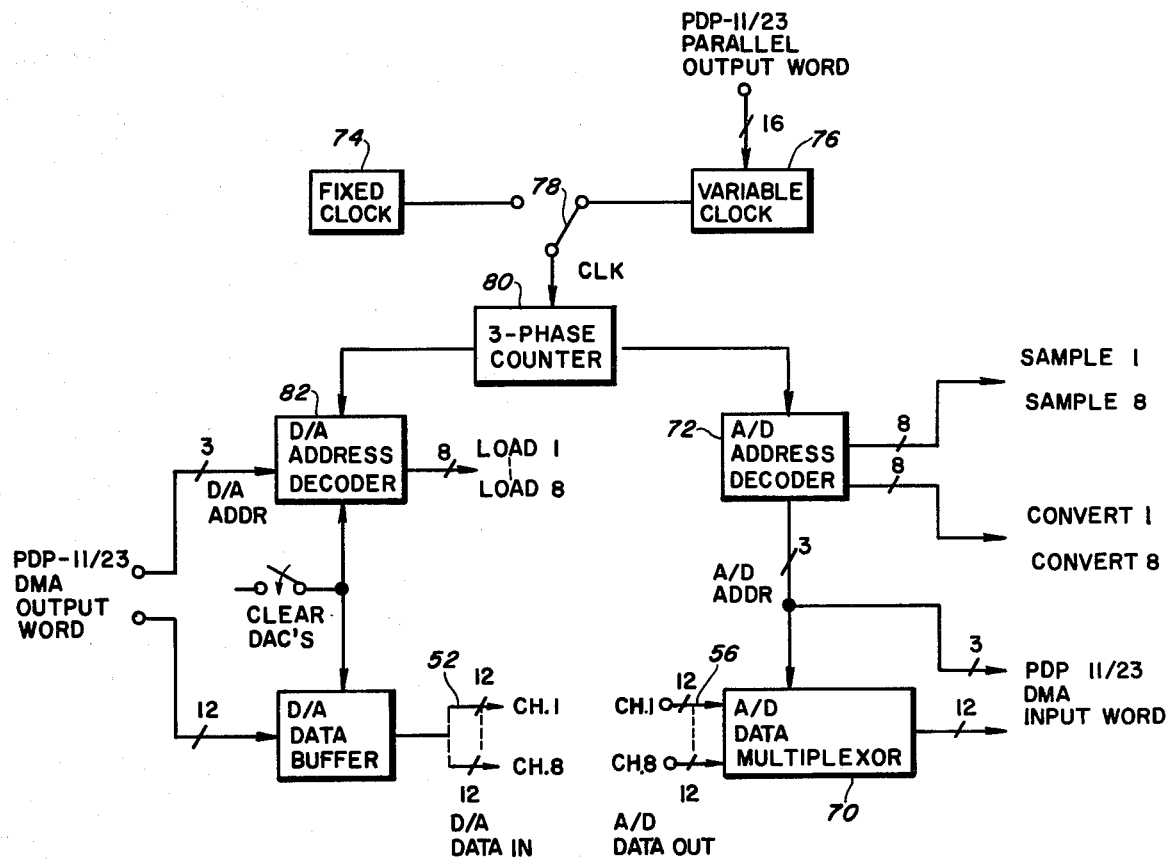

A block diagram of an ICC 54, depicted in FIG. 5, that was actually constructed is set forth in FIG. 6. The ICC 54 is a clock-driven sequential logic circuit which establishes the timing of the A/D and D/A conversions as well as DMA transfers to the computer. The symmetry of the ICC design is evident in FIG. 6. Each DMA 55 output word consists of 12 bits of data and three bits of address. The data bits are buffered and applied in parallel to all eight D/A channels 52. The address bits are decoded and used to direct a LOAD pulse to one of the eight D/A channels 52. In this way, each data word is steered into the proper D/A device. Similarly, each DMA 55 input word consists of 12 bits of A/D data and a 3-bit address identifying the A/D channel 56 supplying this data. These same address bits control a multiplexer 70 which sequentially steers each A/D channel output to the DMA interface 55. The A/D address decoder 72 also provides SAMPLE and CONVERT pulses, properly timed, to the eight A/D channels. Upon receipt of a SAMPLE pulse from the ICC the sample-and-hold circuit in each A/D channel acquires and holds the latest input level from a monitor 20. The output of the sample-and-hold circuit is applied to the A/D convertor in its related A/D channel. The properly timed CONVERT pulse from the ICC 54 then triggers the A/D convertor so that a digital projector output signal is produced.

The rate at which the above-described operations takes place is determined by a clock signal. The ICC includes a fixed clock 74 and variable clock 76.

The fixed clock is 500 kHz and is used for testing the hardware. The variable clock 76 is programmable by the computer via a DRV11 parallel interface; this is the "normal" system clock. A panel switch 78 allows the operator to select one of these clock signals. A 3-phase counter 80 divides the clock frequency by five; different phases are used to drive the D/A and A/D address decoders 82, 72. DMA transfers occur at a rate $f_{DMA}=fc/5$, where fc is the clock frequency. Since there are a total of 16 channels (8 A/D and 8 D/A), the actual sample rate for each channel is $fs=f_{DMA}/16=fc/80$. Experience has shown that the DRV11-B DMA interface card in the PDP-11/23 limits the DMA transfer rate, $f_{DMA}$, to about 120 kHz. This establishes the upper frequency limit for the system.

The software for the calibrator consists of a single task designed to obtain the free-field directivity pattern and voltage sensitivity of a line hydrophone. In general terms, the program drives an array of projectors to simulate a calibration wave so that the directivity pattern and sensitivity of the line hydrophone can be measured. Sidelines of the program include techniques for calibrating the receive amplifiers, and for measuring system noise. The software prepared for the calibrator consists of three general parts: (1) hardware control, (2) data processing, and (3) "user interface".

The hardware controlled by this program consists of A/D and D/A converters, and a sampling clock. It is more precise to say that these devices are controlled by two interfaces inserted into the PDP-11's Q-bus: a DRV-11 parallel output card to control the clock, and a DRV-11B direct memory access (DMA) card to control the converters. Assembly language subroutines control these interfaces without the use of interrupts or device drivers; a "device common" is employed to map register addresses directly to the I/O page.

The data processing part of the program includes the following processes.

1. Enter the number of transducers involved: projectors 22 and monitors 20; and enter transducer parameters, from kwyboard or from calibration file. (These include monitor calibrations, monitor separations, statistical weighting for monitor data, calibration of receive channels: gain and phase.)

2. Calibrate the system if desired. This involves driving one D/A and comparing the output from each A/D (measured 10 times and then averaged) the voltage measured by a precision voltmeter. The calibrated gain in the receive channels is around 50 dB. Calibration is done at a specified frequency, although in practice it varies only about 0.1 dB and 0.5 degree throughout the practical frequency range (5 Hz to 640 Hz).

3. Measure system noise. A normal measurement is taken, and then repeated with the drive to the projectors disconnected; each the average of ten measurements. Signal, noise, standard deviation, and signal-to-noise ratio is printed. The latter is generally greater than 60 dB.

4. Restore or modify default measurement parameters (including sound speed, standing wave duration, and desired sound pressure level); an specify data range (frequency range and increment, directivity range and increment).

5. Compute and load a sinusoidal waveform into the DMA data buffer to drive each projector individually and measure all hydrophone outputs each time. This data is stored in a matrix; and, following computation, drive levels (amplitude and phase) are available for each projector such that when driven simultaneously they will simulate a calibration wave in the system. Do this at each frequency and angle, and measure the line hydrophone output, finally computing its directivity pattern and sensitivity.

The user interface part of the program includes techniques for making the program easy to use for the operator, and easy to maintain (modify). In the latter case this means the coding is heavily documented, and structured programming theory is employed (which just says the program was split along functional lines into many "independent", easily modifiable, subprograms).

For user convenience, most parameters are easily and appropriately entered or modified in response to concise but explicit inquiries. To eliminate much of the repetitious data entry this may create, a "defaults" file was created, whereby certain generally non-variant parameters are stored in an ASCII file (which can be modified by any editor) which is read by the program in a manner that allows the user to retain or change each parameter. The other file is a "calibration" file, containing the results of a calibration process, so that the user need not either calibrate the system or enter many variables each time the program is run.

The actual computer program developed to implement the above-described processes is included as an appendix. It is understood that the appended computer program is exemplary and that numerous other computer programs can implement the novel principles disclosed herein.

Figure 3:
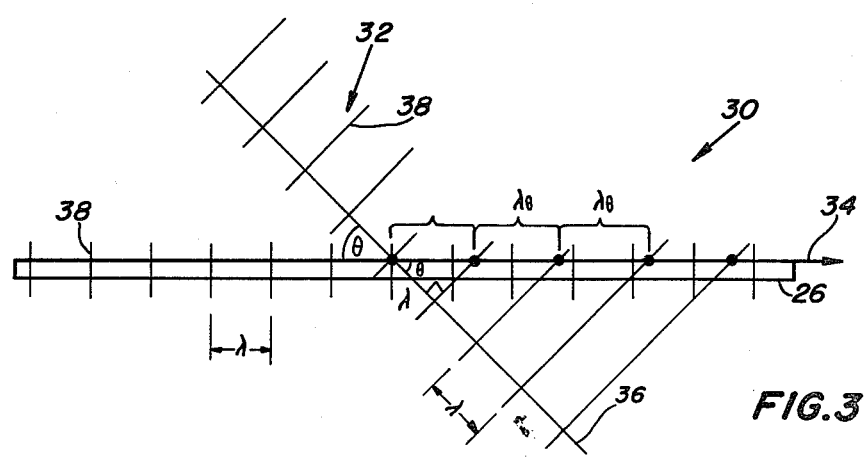
FIG. 3 is a schematic diagram of two plane waves incident on the hydrophone array.

It is to be understood that the calibration chamber 10 depicted in FIGS. 1, 2 and 3 need not be operated by a computerized control circuit. An operator may sequentially apply a reference driving voltage signal to each projector and record the amplitudes and phases of the monitor outputs signals. Matrices A and $A^{-1}$ are then calculated so that the amplitudes and phases of the driving voltage signals for driving the projectors 22 to generate a calibration wave travelling at $v_\theta$ can be calculated. The operator then sets the projector drivers 40 to provide the correct driving voltage signals to the projectors 22 to form a calibration wave with the apparent velocity $v_\theta$. The directivity pattern is then plotted. Similar steps would be followed to obtain the sensitivity pattern.

It is to be further understood that projectors 22 and monitors 20 do not have to be mounted within the chamber. In fact, if the walls of the chamber are made out of piezoactive material, the walls can function as the projectors and monitors.

Obviously, numerous (additional) modifications and variations of the present invention are possible in light of the above teachings. It therefore to be understood that within the scope of the appended claims, the invention may be practiced otherwise than as specifically described herein.

APPENDEX

```
PROGRAM BEAMER
C
C     THIS PROGRAM IS DESIGNED TO PERFORM BOTH FREQUENCY
C     SWEEP AND DIRECTIVITY SWEEP MEASUREMENTS ON THE BEAM
C     FORMER DESIGNED BY JOE ZALESAK.
C
C     EXTENSIONS WILL CALIBRATE THE SYSTEM AND MEASURE SYSTEM NOISE.
C
C     THE TUBE MAY CONSIST OF UP TO 8 PROJECTORS AND
C     8 CALIBRATED RECEIVERS.
C     WRITTEN BY R. E. SCOTT MODIFIED BY L. D. LUKER
C
      BYTE DT(20)              ! DATE & TIME
      BYTE CALFIL(30)          ! SYSTEM CAL. FILENAME
      REAL HCAL(8)             ! HYDROPHONE CALIBRATIONS
      REAL ESP(8)              ! HYDROPHONE ELEMENT SPACING
      REAL VCAL(8)             ! A/D CALIBRATION (LEVEL)
      REAL PCAL(8)             ! A/D CALIBRATION (PHASE)
      REAL HW(8)               ! HYDROPHONE WEIGHTING FACTORS
      REAL AMPD(8)             ! DRIVE AMPLITUDES
      REAL SNLN(361)           ! SENSITIVITY OF LINE
      COMPLEX M(256)           ! P=M*D RELATIONAL MATRIX
      COMPLEX D(8)             ! PROJECTOR DRIVES
      COMPLEX P(8)             ! SOUND PRESSURES
      INTEGER BUFFER(7000)     ! DMA I/O BUFFER
      COMPLEX R(64),S(64),T(64),U(64),W(64),F(64),CSPL,X
      COMPLEX CP0PA,CAK
C
      COMMON /ZNUM/NPROJ,NRECR,NCYC,NELE,NPPW,PPC
C     NCYC (NUMBER OF CYCLES), NPPW (POINTS PER WAVEFORM)
C
      COMMON /PMAX/SFMAX,MBUF,MPPC,MCYC
C     MCYC (MINIMUM CYCLES)
C
      DATA PI/3.1415927/
      DATA HW/8*1.0/
      DATA DT/20*' '/
      DATA CALFIL/30*' '/
C
C     START OF PROGRAM
      MBUF=7000                ! MAXIMUM DMA BUFFER SIZE
      NELE=16                  ! MAXIMUM NUMBER OF TRANSDUCERS
      MAXR=8                   ! MAXIMUM NUMBER OF RECEIVERS
      MAXP=8                   ! MAXIMUM NUMBER OF PROJECTORS
      SFMAX=150000.            ! MAXIMUM SAMPLE RATE
      MPPC=4                   ! MINIMUM POINTS PER CYCLE
      IPPC=25                  ! "IDEAL" POINTS PER CYCLE
      IF (IPPC*NELE.GT.MBUF) IPPC=MBUF/NELE
      KM=10                    ! CALIBRATION: AVERAGE NM READINGS
      LIN=7                    ! HYDROPHONE CHAN. FOR LINE
C
C     SET INITIAL VALUES
      NPROJ=3                  ! NUMBER OF PROJECTORS
      NRECR=3                  ! NUMBER OF RECEIVERS
      FREQ=360.                ! FREQUENCY
      CS=1497.                 ! SOUND SPEED
      ALPHA=0.0                ! MATRIX STABILITY PARAMETER
      AMPI=2.0                 ! INITIAL PROJECTOR AMPLITUDE
      SWDI=1000.               ! STANDING WAVE DURATION
      MPPC=4                   ! MINIMUM POINTS PER CYCLE
      P0=126.                  ! SOUND PRESSURE LEVEL
      GNHYD=20.0               ! HYDROPHONE AMP. GAIN
      GNLIN=-60.0              ! LINE AMP. GAIN
      FFIRST=360.              ! FIRST FREQUENCY
      FLAST=360.               ! LAST FREQUENCY
      LIOG=2                   ! FREQUENCY SWEEP TYPE
      FINGLE=0.                ! FIRST ANGLE
      FLANGL=0.                ! LAST ANGLE
      PPC=25                   ! POINTS PER CYCLE
      NCYC=5                   ! CYCLES PER DMA
C
110   CALL DATE(DT(1))
      CALL TIME(DT(11))
      WRITE (6,120)DT
120   FORMAT (/' ADAPTIVE BEAM FORMER (PIPE CALIBRATOR)',T53,20A1)
      CALL ENTRY
130   WRITE (6,140)
```

```
140     FORMAT (' NUMBER OF PROJECTORS:')
        CALL IENT(NPROJ)
150     FORMAT (I2)
        IF (NPROJ.GT.MAXP) GOTO 130
160     WRITE (6,170)
170     FORMAT (' NUMBER OF RECEIVERS:')
        CALL IENT(NRECR)
        IF (NRECR.GT.MAXR) GOTO 160
C
C       ENTER HYDROPHONE VARIABLES
        CALL ZNHYD(CALFIL,MAXR,NRECR,HCAL,ESP,VCAL,PCAL,HW)
C
C       CALIBRATE THE VOLTAGE AND PHASE PARAMETERS
180     WRITE (6,190)
190     FORMAT ('$CALIBRATE THE SYSTEM (Y:N)? ')
        READ (5,200,END=530,ERR=180) IANS
200     FORMAT (A1)
        IF (IANS.NE.'Y ') GOTO 260
210     WRITE (6,220)
220     FORMAT (/' CALIBRATE FREQUENCY (HZ): ')
        CALL RENT(FREQ)
230     FORMAT (F10.0)
        IF=1
        CALL FPCOMP (FREQ,SFREQ,IWBUF,IF,ISW)
        PDUR=1000.*(IWBUF/SFREQ)
        NDMA=1
        CALL ZDPAR (FREQ,SFREQ,PPC,NPPW,NCYC,NDMA,PDUR)
        CALL SM102 (SFREQ*5.0,ISW)
        CALL ZERALL (BUFFER,MBUF,MAXP)
        CALL SETONE (1,BUFFER,MBUF,3.0,0.0)
240     CALL ZCAL (BUFFER,IWBUF,VCAL,PCAL,NM,FREQ,MAXR,SFREQ)
        CALL ZCALNM(CALFIL)
        CALL ZNSAVE(CALFIL,MAXR,HCAL,ESP,VCAL,PCAL,FREQ,HW)
        WRITE (6,250)
2       FORMAT (/'$REPEAT (Y:N)?')
        READ (5,200,END=530) IANS
        IF (IANS.EQ.'Y ') GOTO 240
C
260     WRITE (6,270)
270     FORMAT ('$MEASURE SYSTEM NOISE (Y:N)? ')
        READ (5,200,END=530) IANS
        IF (IANS.NE.'Y ') GOTO 310
280     WRITE (6,290)
290     FORMAT (' AT FREQUENCY (HZ): ')
        CALL RENT(FREQ)
        IF=1
        CALL FPCOMP (FREQ,SFREQ,IWBUF,IF,ISW)
        CALL SM102 (SFREQ*5.0)
        CALL ZERALL (BUFFER,MBUF,MAXP)
        DO 300 I=1,MAXP
300     CALL SETONE (I,BUFFER,MBUF,3.0,0.0)
        CALL ZNOISE (BUFFER,IWBUF,NM,FREQ,MAXR)
        WRITE (6,250)
        READ (5,200,END=530) IANS
        IF (IANS.EQ.'Y ') GOTO 280
310     CONTINUE
        WRITE (6,320)
320     FORMAT (/' *** CONFIGURE FOR MEASUREMENT ***'/)
C
C       ENTER PHYSICAL PARAMETERS
330     CALL EPP (CS,ALPHA,AMPI,SWDI,MPPC,NELE,MBUF,P0,GNHYD,GNLIN)
C
C       ENTER FREQUENCY PARAMETERS
        CALL EFP (FFIRST,FLAST,FINC,NFRP,LIOG)
C
C       ENTER DIRECTIVITY (ANGLE) INFORMATION
        CALL EDP (FINGLE,FLANGL,DINC,NDGP)
C
340     FREQ=FFIRST
        DO 345 I=1,NPROJ
3       AMPD(I)=AMPI
C
C       ******** FREQUENCY SWEEP BEGINNING ********
C
        DO 510 IF=1,NFRP
        SMX=-1000.
C
```

```
C       FREQUENCY PARAMETER COMPUTATION
        IFX=IF
        CALL FPCOMP (FREQ,SFREQ,IWBUF,IFX,ISW)
        AK=2.*PI*FREQ/CS            ! K-FACTOR FOR PRESSURE FUNCTION
        PDUR=1000.*(IWBUF/SFREQ)
        NDMA=SWDI/PDUR+.5
C
C       LIST THE DRIVE PARAMETERS
        CALL ZDPAR (FREQ,SFREQ,PPC,NPPW,NCYC,NDMA,PDUR)
C
C       SET UP THE SAMPLE RATE SYNTHESIZER AT FIVE TIMES SAMPLE RATE
        CALL SM102 (SFREQ*5.0,ISW)
C
C       RUN ALL PROJECTORS INDIVIDUALLY AND GET HYDROPHONE OUTPUTS
        IPXR=8                       ! REFERENCE CHANNEL + 1
        AMPIR=1.414
350     DO 370 IP=1,NPROJ            ! ONCE FOR EACH PROJECTOR
        WRITE (6,360) IP-1,AMPD(IP)
C       FORMAT (' DRIVING PROJECTOR',I2,' AT',F7.3,' VOLTS.')
        CALL ZERALL (BUFFER,MBUF,MAXP)  ! ZERO ALL PROJ. WAVEFORMS
        PHASE=0.0                    ! PHASE DOESN'T MATTER HERE
        IPX=IP
        CALL SETONE (IPXR,BUFFER,MBUF,AMPIR,PHASE) ! SET UP REFERENCE
        CALL SETONE (IPX,BUFFER,MBUF,AMPD(IP),PHASE) ! AND SET ONE UP
C
C       EXECUTE THE DMA, READING THE HYDROPHONES
        IDLY=0
        CALL ADMA (BUFFER,IWBUF,NDMA,IDLY,ISW)
C
C       COMPUTE THE AMPLITUDES AND PHASES OF HYDROPHONE OUTPUTS (DFT)
        DO 370 IR=1,NRECR
        IRT=IR
        CALL ZAPC (BUFFER,IRT,VCAL(IRT),PCAL(IRT),RMSV,PHASE,CPHASE)
        CALL COMSPL (RMSV,CPHASE,HCAL(IRT),GNHYD,CSPL)
C
C       ENTER VALUES IN M-MATRIX
        X=CSPL/CMPLX(AMPD(IP),0.0)
        ITP=(IRT-1)*NRECR+IP
        M(ITP)=X
370     CONTINUE
C
C       OUTPUT MATRIX "M"
D       CALL ZMOUT (M,NRECR,NPROJ,"115)
C
C       ++++++++ BEGINNING OF ANGULAR SWEEP ++++++++
C       (ONE POINT SWEEP IF FREQUENCY SWEEP ONLY)
        DEGREE=FINGLE                ! INITIAL ANGLE AT THIS FREQUENCY
        DO 470 ID=1,NDGP
C
        WRITE (6,380) DEGREE
380     FORMAT (/' ANGLE =',F6.1,' DEGREES')
C
C       COMPUTE DRIVE LEVELS TO OBTAIN DESIRED SPL'S
C       CORRECT PRESSURES FOR PHASE SHIFT
        RAD=DEGREE*PI/180.           ! ANGLE IN RADIANS
        POPA=10.**(PO/20.)           ! DESIRED SPL IN MICROPASCALS
D       TYPE *,'RAD=',RAD,' POPA=',POPA,' AK=',AK
        DO 400 I=1,NRECR
        CPOPA=CMPLX(POPA,0.0)
        CAK=CMPLX(0.0,AK*ESP(I)*SIN(RAD))
        P(I)=CPOPA*CEXP(CAK)
D       WRITE(6,390) I-1,CPOPA,ESP(I),CAK,P(I)
D       FORMAT(' I=',I2,2X,'CPOPA=',1PE11.4,',',1PE11.4
D      1,2X,'ESP(I)=',1PG11.4,2X,'CAK=',1PE11.4,',',1PE11.4
D      2,2X,'P(I)=',1PE11.4,',',1PE11.4)
400     CONTINUE
C
C       COMPUTE THE DRIVE MATRIX D
C       (NOTE: U, W, F, R, S, T ARE BUFFERS INTERNAL TO ZDRIVE)
        CALL ZDRIVE (M,P,D,NRECR,NPROJ,U,W,F,R,S,T,ALPHA,HW)
C
C       COMPUTE WAVEFORMS FOR THE FINAL DRIVE
        DO 420 IP=1,NPROJ            ! FOR EACH PROJECTOR
        AMPR=REAL(D(IP))             ! AMPLITUDE REAL
        AMPIM=AIMAG(D(IP))           ! AMPLITUDE IMAGINARY
        AMPD(IP)=SQRT(AMPR*AMPR+AMPIM*AMPIM) ! AMPLITUDE MAGNITUDE
        APHAS=ATAN2(AMPIM,AMPR)      ! PHASE
        IPX=IP
```

```
              IF (ID.EQ.1) WRITE (6,410) IP-1,AMPD(IP),APHAS*180./PI
410    FORMAT (' DRIVE AT 'I1' ='F6.3' VPEAK AT 'F6.1' DEGREES')
       CALL SETONE (IPX,BUFFER,MBUF,AMPD(IP),APHAS) ! COMPUTE VALUES
420    CONTINUE
C
C      EXECUTE THE DMA, READING THE HYDROPHONES
       WRITE (6,430)
       FORMAT (' ALL PROJECTORS DRIVING')
       IDLY=0
       CALL ADMA (BUFFER,IWBUF,NDMA,IDLY,ISW)
C
C      COMPUTE THE SENSITIVITY
       SPMN=1000.
       SPMX=-1000.
       SPA=0.0
       DO 450 IR=1,NRECR
       IRT=IR
       CALL ZAPC (BUFFER,IRT,VCAL(IRT),PCAL(IRT),RMSV,PHASE,CPHASE)
       CALL COMSPL (RMSV,CPHASE,HCAL(IRT),GNHYD,CSPL)
       SPDB=CSPL*CONJG(CSPL)
       SPDB=10.*ALOG10(SPDB)
       SPMN=MIN(SPMN,SPDB)
       SPMX=MAX(SPMX,SPDB)
       SPA=SPA+SPDB
       WRITE (6,440) IRT-1,SPDB,CPHASE
440    FORMAT (' SPL AT 'I2' = 'F5.1' DB; 'F6.1' DEGREES')
450    CONTINUE
       IF (IF*ID.GT.1) GOTO 458
       WRITE(6,455)SPMX-SPMN
455    FORMAT(/,'$THE SOUND PRESSURE RANGE IS'
      1,F5.1,' DB.   DO YOU WANT TO TRY AGAIN? (Y/N) ')
       READ (5,200,END=530) IANS
       IF (IANS.EQ.'Y') GOTO 350
C
C      COMPUTE SENSITIVITY OF LINE INPUT
458    CALL ZAPC (BUFFER,LIN+1,VCAL(LIN+1),PCAL(LIN+1),RMSV,PHASE,CPHASE)
       CALL COMSPL (RMSV,CPHASE,HCAL(LIN+1),0.0,CSPL)
       SPA=SPA/NRECR                      !AVERAGE SPL
       XVS=20.*ALOG10(RMSV)-SPA-CNLIN     !VOLTAGE SENSITIVITY
       SNLN(ID)=XVS
       SMX=MAX(SMX,XVS)
       WRITE (6,460) XVS,CPHASE
460    FORMAT (' LINE SENSITIVITY (DB-V/MICROPASCAL)='
      1,F7.1,' DB;',F7.1,' DEGREES')
       TYPE *,'NUMBER OF CYCLES TO PRINT:'
       CALL IENT(NCTP)
D      NY=PPC*NCTP
D      IF (NCTP.GT.0) CALL PRTDMA(BUFFER,NY)
470    DEGREE=DEGREE+DINC
C
C      ++++++++ END OF ANGULAR SWEEP ++++++++
       IF (NDGP.LE.1) GOTO 500
C
C      PLOT RESULTS ON THE PRINTER
       WRITE(6,480)FREQ
480    FORMAT(/T50,'FREQUENCY (HZ)=',F6.1
      1/T4,'ANGLE',T14,'REL. SENS.',T27,'-40',T107,'0')
       DO 490 I=1,NDGP
       WRITE(6,485)FINGLE+(I-1)*DINC,SNLN(I)-SMX
485    FORMAT(T2,F6.1,T15,F6.1)
       CALL PRPLT(27,10,8,-40.,0.,SNLN(I)-SMX)
490    CONTINUE
C
C      CHANGE FREQUENCIES IF FREQUENCY SWEEP
500    IF (LIOG.EQ.1) FREQ=10.**(ALOG10(FREQ)+FINC)   !LOG SWEEP
       IF (LIOG.EQ.2) FREQ=FREQ+FINC                  !LINEAR SWEEP
510    CONTINUE
C
C      ******** END OF FREQUENCY SWEEP ********
C
       CALL ZERALL (BUFFER,NELE,MAXP)    ! ZERO PROJ. TERMINALS
       CALL ADMA (BUFFER,NELE,1,0,ISW)
       WRITE (6,520)
520    FORMAT (/)
       WRITE (6,250)
       READ (5,200,END=530) IANS
       IF (IANS.EQ.'Y') GOTO 340
       IF (IANS.EQ.'A') GOTO 110
       GOTO 330
```

```
C
C        IF A ^Z IS TYPED....
530      CALL QUITS
         END
         SUBROUTINE CMADD
C
C
C        PURPOSE:
C           ADD TWO GENERAL MATRICES TO FORM RESULTANT GENERAL MATRIX;
C           MATRICES ARE COMPLEX
C
C        USAGE
C           CALL CMADD (A,B,R,N,M)
C
C        DESCRIPTION OF PARAMETERS
C           A - NAME OF FIRST INPUT MATRIX
C           B - NAME OF SECOND INPUT MATRIX
C           R - NAME OF OUTPUT MATRIX
C           N - NUMBER OF ROWS IN A,B,R
C           M - NUMBER OF COLUMNS IN A,B,R
C
C        REMARKS
C           ALL MATRICES MUST BE STORED AS COMPLEX GENERAL MATRICES
C
C        METHOD
C           ADDITION IS PERFORMED ELEMENT BY ELEMENT
C
         SUBROUTINE CMADD (A,B,R,N,M)
         COMPLEX A(1),B(1),R(1),X
C
C        CALCULATE NUMBER OF ELEMENTS
         NM=N*M
C
C        ADD MATRICES
         DO 10 I=1,NM
         X=A(I)+B(I)
10       R(I)=X
         RETURN
         END
         SUBROUTINE CMCJ
C
C
C        PURPOSE:
C           FIND COMPLEX CONJUGATE OF GENERAL MATRIX
C
C        USAGE
C           CALL CMCJ (A,R,N,M)
C
C        DESCRIPTION OF PARAMETERS
C           A - NAME OF INPUT MATRIX
C           R - NAME OF OUTPUT MATRIX
C           N - NUMBER OF ROWS IN A,R
C           M - NUMBER OF COLUMNS IN A,R
C
C        REMARKS
C           ALL MATRICES MUST BE STORED AS COMPLEX GENERAL MATRICES
C
C        METHOD
C           CONJUGATION IS PERFORMED ELEMENT BY ELEMENT
C
         SUBROUTINE CMCJ (A,R,N,M)
         COMPLEX A(1),R(1),X
C
C        CALCULATE NUMBER OF ELEMENTS
         NM=N*M
C
C        CONJUGATE MATRICES
         DO 10 I=1,NM
         X=A(I)
         X=CONJG(X)
10       R(I)=X
         RETURN
         END
         SUBROUTINE CMINV
C
C
C        PURPOSE
C           INVERT A COMPLEX MATRIX
C
C        USAGE
C           CALL CMINV (A,N,D,L,M)
```

```
C       DESCRIPTION OF PARAMETERS
C           A - INPUT MATRIX, DESTROYED IN COMPUTATION AND REPLACED BY
C                 RESULTANT INVERSE.
C           N - ORDER OF MATRIX A
C           D - RESULTANT DETERMINANT
C           L - WORK VECTOR OF LENGTH N
C           M - WORK VECTOR OF LENGTH N
C
C       REMARKS
C           MATRIX A MUST BE A GENERAL MATRIX
C
C       METHOD
C           THE STANDARD GAUSS-JORDAN METHOD IS USED. THE DETERMINANT
C           IS ALSO CALCULATED. A DETERMINANT OF ZERO INDICATES THAT
C           THE MATRIX IS SINGULAR.

SUBROUTINE CMINV (A,N,D,L,M)
        COMPLEX A(1),D,BIGA,HOLD,X
        INTEGER L(N),M(N)

C       SEARCH FOR LARGEST ELEMENT
        NK=-N
        DO 80 K=1,N
        NK=NK+N
        L(K)=K
        M(K)=K
        KK=NK+K
        BIGA=A(KK)
        X=CONJG(BIGA)
        BIGXSQ=BIGA*X
        BIGX=SQRT(BIGXSQ)
        DO 20 J=K,N
        IZ=N*(J-1)
        DO 20 I=K,N
        IJ=IZ+I
        X=A(IJ)
        RA=X*CONJG(X)
        IF (BIGX.GE.RA) GOTO 20
        BIGA=A(IJ)
        BIGX=RA
        L(K)=I
        M(K)=J
20      CONTINUE
C
C       INTERCHANGE ROWS
C
        J=L(K)
        IF (J.LE.K) GOTO 35
        KI=K-N
        DO 30 I=1,N
        KI=KI+N
        HOLD=A(KI)
        HOLD=-HOLD
        JI=KI-K+J
        X=A(JI)
        A(KI)=X
30      A(JI)=HOLD
C
C       INTERCHANGE COLUMNS
C
35      I=M(K)
        IF (I.LE.K) GOTO 45
        JP=N*(I-1)
        DO 40 J=1,N
        JK=NK+J
        JI=JP+J
        HOLD=A(JK)
        HOLD=-HOLD
        X=A(JI)
        A(JK)=X
40      A(JI)=HOLD
C
C       DIVIDE COLUMN BY MINUS PIVOT (VALUE OF PIVOT ELEMENT IS
C       CONTAINED IN BIGA)
C
45      IF (BIGX.NE.0.0) GOTO 48
        D=0.0
```

```
            RETURN
    45      DO 55 I=1,N
            IF (I.EQ.K) GOTO 55
            IK=NK+I
            X=A(IK)
            X=X/(-BIGA)
            A(IK)=X
    55      CONTINUE
    C
    C       REDUCE MATRIX
    C
            DO 65 I=1,N
            IK=NK+I
            HOLD=A(IK)
            IJ=I-N
            DO 65 J=1,N
            IJ=IJ+N
            IF (I.EQ.K) GOTO 65
            IF (J.EQ.K) GOTO 65
            KJ=IJ-I+K
            X=A(KJ)
            X=HOLD*X+A(IJ)
            A(IJ)=X
            CONTINUE
    C
    C       DIVIDE ROW BY PIVOT
    C
            KJ=K-N
            DO 75 J=1,N
            KJ=KJ+N
            IF (J.EQ.K) GOTO 75
            X=A(KJ)
            X=X/BIGA
            A(KJ)=X
    75      CONTINUE
    C
    C       PRODUCT OF PIVOTS
    C
    C       REPLACE PIVOT BY RECIPROCAL
    C
            X=1.0/BIGA
            A(KK)=X
    80      CONTINUE
    C
    C       FINAL ROW AND COLUMN INTERCHANGE
    C
            K=N
    100     K=(K-1)
            IF (K.LE.0) GOTO 150
            I=L(K)
            IF (I.LE.K) GOTO 120
            JQ=N*(K-1)
            JR=N*(I-1)
            DO 110 J=1,N
            JK=JQ+J
            HOLD=A(JK)
            JI=JR+J
            X=A(JI)
            X=-X
            A(JK)=X
    110     A(JI)=HOLD
    120     J=M(K)
            IF (J.LE.K) GOTO 100
            KI=K-N
            DO 130 I=1,N
            KI=KI+N
            HOLD=A(KI)
            JI=KI-K+J
            X=A(JI)
            X=-X
            A(KI)=X
    130     A(JI)=HOLD
            GOTO 100
    150     CONTINUE
            D=1.0
            RETURN
            END
```

```
C      SUBROUTINE CMPRD
C
C      PURPOSE
C         MULTIPLY TWO GENERAL MATRICES TO FORM A RESULTANT GENERAL
C         MATRIX; MATRICES ARE COMPLEX
C
C      USAGE
C         CALL CMPRD (A,B,R,N,M,L)
C
C      DESCRIPTION OF PARAMETERS
C         A - NAME OF FIRST INPUT MATRIX
C         B - NAME OF SECOND INPUT MATRIX
C         R - NAME OF OUTPUT MATRIX
C         N - NUMBER OF ROWS IN A
C         M - NUMBER OF COLUMNS IN A AND ROWS IN B
C         L - NUMBER OF COLUMNS IN B
C
C      REMARKS
C         ALL MATRICES MUST BE STORED AS GENERAL MATRICES
C         MATRIX R CANNOT BE IN THE SAME LOCATION AS MATRIX A
C         MATRIX R CANNOT BE IN THE SAME LOCATION AS MATRIX B
C         NUMBER OF COLUMNS OF MATRIX A MUST BE EQUAL TO NUMBER OF ROWS
C         OF MATRIX B
C
C      METHOD
C         THE M BY L MATRIX B IS PREMULTIPLIED BY THE N BY M MATRIX A
C         AND THE RESULT IS STORED IN THE N BY L MATRIX R.
C
       SUBROUTINE CMPRD (A,B,R,N,M,L)
       COMPLEX A(1),B(1),R(1),X
C
       IR=0
       IK=-M
       DO 10 K=1,L
       IK=IK+M
       DO 10 J=1,N
       IR=IR+1
       JI=J-N
       IB=IK
       R(IR)=0.0
       DO 10 I=1,M
       JI=JI+N
       IB=IB+1
       X=R(IR)+A(JI)*B(IB)
    1  R(IR)=X
       RETURN
       END
C      SUBROUTINE CMTRA
C
C      PURPOSE
C         TRANSPOSE A COMPLEX GENERAL MATRIX
C
C      USAGE
C         CALL CMTRA (A,R,N,M)
C
C      DESCRIPTION OF PARAMETERS
C         A - NAME OF MATRIX TO BE TRANSPOSED
C         R - NAME OF RESULTANT MATRIX
C         N - NUMBER OF ROWS OF A AND COLUMNS OF R
C         M - NUMBER OF COLUMNS OF A AND ROWS OF R
C
C      REMARKS
C         MATRIX R CANNOT BE IN THE SAME LOCATION AS MATRIX A
C         MATRICES A AND R MUST BE STORED AS GENERAL MATRICES
C
C      METHOD
C         TRANSPOSE N BY M MATRIX A TO FORM M BY N MATRIX R
C
       SUBROUTINE CMTRA (A,R,N,M)
       COMPLEX A(1),R(1),X
C
       IR=0
       DO 10 I=1,N
       IJ=I-N
       DO 10 J=1,M
       IJ=IJ+N
       IR=IR+1
       X=A(IJ)
   10  R(IR)=X
       RETURN
       END
```

```
      SUBROUTINE COMSPL (RMSV,CPHASE,HCAL,AMPGAN,CSPL)
C
C     SUBROUTINE TO COMPUTE COMPLEX SPL FROM THE VOLTAGE AND PHASE.
C
      COMPLEX CSPL
C
C     COMPUTE SOUND PRESSURE LEVEL
      RESP=20.*ALOG10(RMSV)      !HYDROPHONE OUTPUT IN DB
      SPL=RESP-HCAL-AMPGAN       !SPL IN DB
      PRES=10.**(SPL/20.)             !SPL IN MICROPASCALS
C     SO NOW WE GET
      XREAL=PRES*COS(CPHASE*3.1415927/180.)
      XIMAG=PRES*SIN(CPHASE*3.1415927/180.)
      CSPL=CMPLX(XREAL,XIMAG)
C
C     PRINT OUT THE MEASURED VALUES
D     WRITE (6,200) SPL,CPHASE,CMPLX(XREAL,XIMAG)
D200  FORMAT (' *COMSPL*   SPL='F6.1
D    1'; CORRECTED PHASE='F6.1'; COMPLEX VALUE='E10.3','E10.3)
C
      RETURN
      END
      FUNCTION D2A (IBITS,FULL)
C
C     FUNCTION TO CONVERT A TWELVE-BIT BINARY VALUE TO
C     A VOLTAGE.
C
C     D TO A CONVERTER OF FORM:
C     000 000 000 000 = FS - LSB
C     011 111 111 111 = 0
C     111 111 111 111 = -FS
C
      MBITS=IAND(IBITS,"7777)
      D2A = FULL*("3777-MBITS)/"4000
C
      RETURN
C
      END
      SUBROUTINE EDP (FINGLE,FLANGL,DINC,NDGP)
C
C     INPUT THE ANGULAR PARAMETERS
C
120   WRITE (6,130)
130   FORMAT (' INITIAL ANGLE (DEG):')
      CALL RENT(FINGLE)
140   FORMAT (F10.0)
150   WRITE (6,160)
160   FORMAT (' FINAL ANGLE (DEG):')
      CALL RENT(FLANGL)
      IF (FLANGL.EQ.FINGLE) GOTO 200
      IF (FLANGL.NE.0) GOTO 210
200   DINC=0.0
      NDGP=1
      FLANGL=FINGLE
      RETURN
210   WRITE (6,220)
220   FORMAT (' NUMBER OF POINTS:')
      CALL IENT(NDGP)
      FORMAT (I4)
      DINC=(FLANGL-FINGLE)/(NDGP-1)
C
      RETURN
C
1000  CALL QUITS
      END
      SUBROUTINE EFP (FFIRST,FLAST,FINC,NFRP,LIOG)
C
C     ENTER THE FREQUENCY SWEEP PARAMETERS
C
120   WRITE (6,130)
130   FORMAT (' INITIAL FREQUENCY (HZ):')
      CALL RENT(FFIRST)
140   FORMAT (F10.0)
150   WRITE (6,160)
160   FORMAT (' FINAL FREQUENCY (HZ):')
      CALL RENT(FLAST)
C     FINAL FREQUENCY ZERO MEANS SINGLE POINT SWEEP
      IF (FLAST.EQ.FFIRST) GOTO 200
      IF (FLAST.NE.0) GOTO 210
```

```
            FLAST=FFIRST
200         FINC=0
            NFRP=1
            LIOG=2
            RETURN
210         WRITE (6,220)
220         FORMAT (' NUMBER OF POINTS:')
            CALL IENT(NFRP)
230         FORMAT (I4)
            FINC=(FLAST-FFIRST)/(NFRP-1)              !LINEAR INCREMENT
            IF (NFRP.EQ.2) LIOG=2
            IF (NFRP.EQ.2) RETURN
240         WRITE (6,250)
250         FORMAT (' LOGARITHMIC (1) OR LINEAR (2):')
            CALL IENT(LIOG)
            IF (LIOG.EQ.1) FINC=ALOG10(FLAST/FFIRST)/(NFRP-1) !LOG INCREMENT
            RETURN
C
1000        CALL QUITS
            END
            SUBROUTINE ENTRY
C     THIS SUBROUTINE PRINTS A HEADING (CALL ENTRY), AND ALLOWS
C     ENTRY OF EITHER INTEGER (CALL IENT(IVAL)) OR REAL (CALL RENT(RVAL))
C     VALUES WHERE THE DEFAULT IS NO CHANGE OF CURRENT VALUES.
C     THE CALLS SHOULD BE PRECEDED BY WRITE STATEMENTS LABELING THE ITEM.
C     L. D. LUKER    3/5/79
            CALL ERRSET(64,,.FALSE.,,.FALSE.,,)
            WRITE(6,110)
110         FORMAT(/T10,'ITEM',T45,'CURRENT VALUE',T62,'NEW VALUE'/)
            RETURN
C
            ENTRY IENT(IVAL)
120         WRITE(6,130) IVAL
130         FORMAT('+',T49,I7,T64,$)
            READ(5,140,ERR=150,END=230) LEN,ITEMP
140         FORMAT(Q,I12)
            IF (LEN.GT.0) IVAL=ITEMP
            GOTO 170
150         WRITE(6,160)
160         FORMAT(T61,'ENTRY ERROR!'/)
            GOTO 120
170         RETURN
C
            ENTRY RENT(RVAL)
180         WRITE(6,190) RVAL
190         FORMAT('+',T47,1PG13.6,T62,$)
            READ(5,200,ERR=210,END=230) LEN,RTEMP
200         FORMAT(Q,F15.0)
            IF (LEN.GT.0) RVAL=RTEMP
            GOTO 220
210         WRITE(6,160)
            GOTO 180
220         RETURN
C
230         WRITE(6,240)
240         FORMAT(/' EXITING PROGRAM!'/)
            CALL EXIT
            END
            SUBROUTINE EPP(CS,ALPHA,AMPI,SWDI,MPPC,NELE,MBUF,SPL,GNHYD,GNLIN)
C
C           ENTER PHYSICAL PARAMETERS
C
100         WRITE (6,110)
110         FORMAT (' SPEED OF SOUND IN TUBE: (M/S)')
            T1=CS
            CALL RENT(CS)
            IF (CS.NE.0.0) GOTO 130
            CS=T1
            RETURN
C
130         WRITE (6,140)
140         FORMAT (' MATRIX STABILITY PARAMETER:')
            CALL RENT(ALPHA)
C
210         WRITE (6,220)
220         FORMAT (' INITIAL PROJECTOR AMPLITUDE: (VOLTS)')
            CALL RENT(AMPI)
C
```

```
230         WRITE (6,240)
240         FORMAT (' STANDING WAVE DURATION: (MSEC)')
            CALL RENT(SWDI)

WRITE (6,260)
260         FORMAT (' MINIMUM NUMBER OF POINTS PER CYCLE:')
C           CALL IENT(MPPC)
            IF (MPPC*NELE.LE.MBUF) GOTO 310 !CHECK FOR BUFFER OVERFILLING
            WRITE (6,280) MBUF/NELE
280         FORMAT (/' TOO MANY POINTS PER CYCLE'.
            1/' MAXIMUM ALLOWED=' I3)
            CALL EXIT
C
310         WRITE (6,320)
320         FORMAT (' DESIRED SOUND PRESSURE: (DB-MICROPASCAL)')
            CALL RENT(SPL)
C
330         WRITE (6,340)
340         FORMAT (' HYDROPHONE AMPLIFIER GAIN: (DB)')
            CALL RENT(GNHYD)
C
430         WRITE (6,440)
440         FORMAT (' LINE AMPLIFIER GAIN: (DB)')
            CALL RENT(GNLIN)
C
            RETURN
C
            END
            SUBROUTINE FPCOMP (FREQ,SFREQ,IWBUF,IF,ISW)
C
C           SUBROUTINE TO COMPUTE THE FREQUENCY PARAMETERS, THAT IS--
C           SAMPLE RATE, DMA BUFFER SIZE, POINTS PER CYCLE, ETC.
C
            COMMON /ZNUM/NPROJ,NRECR,NCYC,NELE,NPPW,PPC
C           NPROJ (NUMBER OF PROJECTORS), NRECR (NUMBER OF RECEIVERS)
C           NCYC (NUMBER OF CYCLES), NPPW (POINTS PER WAVEFORM)
C           NELE (NUMBER OF ELEMENTS = TRANSDUCERS), PPC (POINTS PER CYCLE)
C
            COMMON /PMAX/SFMAX,MBUF,MPPC,MCYC
C           SFMAX (MAXIMUM SAMPLE RATE)
C           MBUF (MAXIMUM BUFFER), MPPC (MINIMUM POINTS PER CYCLE)
C           MCYC (MINIMUM CYCLES)
C
            ISW=1
            PPC=SFMAX/(FREQ*NELE)-0.1
            NCYC=MBUF/(NELE*PPC)
            GOTO 200
C           IF (IF.GT.1) GOTO 200

WRITE (6,110)
110         FORMAT (' POINTS PER CYCLE: ')
            CALL RENT(PPC)
            IF (PPC.LE.0) GOTO 100
C
            MAX=MBUF/(NELE*PPC)
130         WRITE (6,140) MAX
140         FORMAT (' CYCLES PER DMA (' I3' MAX):')
            CALL IENT(NCYC)
            IF (NCYC.LE.0) GOTO 130
C
200         IWBUF=PPC*NCYC*NELE
            IF (IWBUF.LT.MBUF) GOTO 300
            WRITE (6,210)
210         FORMAT (' TOO MANY POINTS')
            GOTO 100
C
300         SFREQ=FREQ*PPC*NELE
            IF (SFREQ.LT.SFMAX) GOTO 400
            WRITE (6,310)
310         FORMAT (' SAMPLING RATE TOO HIGH')
            GOTO 100
C
            NPPW=PPC*NCYC

C           CORRECT SAMPLING FREQUENCY TO SYNTEST VALUES
            FSAMP=FSET(SFREQ*5.)
            SFREQ=FSAMP/5.
            FTEMP=FREQ
            FREQ=SFREQ/(NELE*PPC)
```

```
        IF (FTEMP.NE.FREQ) WRITE (6,410) FREQ
410     FORMAT (/' MODIFIED FREQUENCY (HZ)= ',F8.3)
        RETURN
C
1000    CALL QUITS
        END

FUNCTION FSET (FREQ)
C
C       FUNCTION TO DETERMINE SAMPLING FREQUENCY TO FIVE AND
C       ONE HALF DIGITS.
C
        BYTE FARAY(20)
C
C       CONVERT FREQUENCY TO AN ASCII STRING
        ENCODE (20,100,FARAY(1)) FREQ
100     FORMAT (F20.08)
C
C       SEARCH FOR POSITION OF MOST-SIGNIFICANT DIGIT
        DO 200 I=1,20
        IF (FARAY(I).NE.' ') GOTO 210
200     CONTINUE
C
C       KEEP FOUR DIGITS (OR FIVE IF FIRST NUMBER IS A ONE)
210     II=I
        IF (FARAY(II).EQ.'1') I=I+6
        IF (FARAY(II).NE.'1') I=I+5
        DO 220 J=II,I
220     IF (FARAY(J).EQ.'.') I=I+1
C
        NO TRUNCATION NEEDED
        IF (I.GE.20) RETURN
C
C       ZERO (TRUNCATE) REMAINDER OF STRING (SKIPPING DECIMAL POINT)
        DO 300 J=I,20
        IF (FARAY(J).EQ.'.') GOTO 300
        FARAY(J)='0'
300     CONTINUE
C
C       CONVERT FREQUENCY BACK TO REAL WORD
        DECODE (20,100,FARAY(1)) FSET
C
        RETURN
        END

FUNCTION IA2D (VALUE,FULL)
C
C       FUNCTION TO CONVERT VALUE TO A TWELVE-BIT BINARY VALUE
C
C       A TO D CONVERTER OF FORM:
C       000 000 000 000 = FS - LSB
C       011 111 111 111 = 0
C       111 111 111 111 = -FS
C
        IA2D = "3777-"4000*VALUE/FULL
C
        RETURN
C
        END

FUNCTION PHSET (PHASE)
C
C       FUNCTION TO NORMALIZE PHASE BETWEEN -180 AND +180 DEGREES.
        PHSET=PHASE
        IF (PHASE.GT. 180.) PHSET=360.-PHASE
        IF (PHASE.LT.-180.) PHSET=360.+PHASE
C
        RETURN
        END

SUBROUTINE PRTDMA(BUFFER,N)
C
C       PRINTS THE FIRST N SETS OF DMA VALUES
C
        INTEGER BUFFER(1)
        WRITE(6,110)(I,I,I=0,7)
110     FORMAT(/,'  N ',8(5X,'P',I1,5X,'R',I1,2X))
        DO 200 I=1,N
        WRITE (6,210) (I-1,
     1  ID2A(BUFFER(16*(I-1)+1),10.0),D2A(BUFFER(16*(I-1)+10),10.0),
```

```
             1D2A(BUFFER(16*(I-1)+3),10.0),D2A(BUFFER(16*(I-1)+12),10.0),
             1D2A(BUFFER(16*(I-1)+5),10.0),D2A(BUFFER(16*(I-1)+14),10.0),
             1D2A(BUFFER(16*(I-1)+7),10.0),D2A(BUFFER(16*(I-1)+16),10.0),
             1D2A(BUFFER(16*(I-1)+9),10.0),D2A(BUFFER(16*(I-1)+2),10.0),
             1D2A(BUFFER(16*(I-1)+11),10.0),D2A(BUFFER(16*(I-1)+4),10.0),
             1D2A(BUFFER(16*(I-1)+13),10.0),D2A(BUFFER(16*(I-1)+6),10.0),
             1D2A(BUFFER(16*(I-1)+15),10.0),D2A(BUFFER(16*(I-1)+8),10.0))
200          CONTINUE
             WRITE(6,210)
210          FORMAT(' ',I3,8(F9.3,F7.3))
             RETURN
             END

SUBROUTINE PRTPLT(NSTCOL,NCPDIV,NDIV,XMN,XMX,XVAL)
C     THIS SUBROUTINE PLOTS A VALUE ON THE PRINTER.
C     REQUIRES:
C       NSTCOL=PRINTER COLUMN TO START PLOT ON
C       NCPDIV=NUMBER OF PRINTER COLUMNS PER DIVISION
C       NDIV=NUMBER OF DIVISIONS PER LINE
C       XMN=MINIMUM X SCALE VALUE
C       XMX=MAXIMUM X SCALE VALUE
C       XVAL=X VALUE TO BE PLOTTED
C     L. D. LUKER    11/12/81
             BYTE LINE(132)
             IXRANG=NDIV*NCPDIV
             LINE(1)='['
             LINE(IXRANG+1)=']'
             DO 100 I=2,IXRANG
             LINE(I)=' '
             XI=(FLOAT(I)-1.)/FLOAT(NCPDIV)
             IF (XI.EQ.INT(XI)) LINE(I)='.'
100          CONTINUE
             IF (XVAL.GE.XMN) GOTO 110
             LINE(1)='<'
             GOTO 190
1            IF (XVAL.LE.XMX) GOTO 150
             LINE(IXRANG+1)='>'
             GOTO 190
150          LN=1.5+IXRANG*(XVAL-XMN)/(XMX-XMN)
             LINE(LN)='*'
190          WRITE(6,200)(LINE(I),I=1,IXRANG+1)
200          FORMAT('+',T(NSTCOL),132A1)
             RETURN
             END

SUBROUTINE SETONE (IP,BUFFER,MBUF,AMPL,PHASE)
C
C            SUBROUTINE TO SETUP ONE PROJECTOR OUTPUT BUFFER
C            WITH A SINUSOID OF AMPLITUDE AMPL, AND PHASE.
C
             INTEGER BUFFER (MBUF)
C
             COMMON /ZNUM/NPROJ,NRECR,NCYC,NELE,NPPW,PPC
C            NPROJ (NUMBER OF PROJECTORS), NRECR (NUMBER OF RECEIVERS)
C            NCYC (NUMBER OF CYCLES), NPPW (POINTS PER WAVEFORM)
C            NELE (NUMBER OF ELEMENTS = TRANSDUCERS), PPC (POINTS PER CYCLE)
C
C            LOAD ONE PROJECTOR BUFFER WITH A SINE WAVE
C
             PI=3.1415927
             IADDR=(8-IP)*4096          !ADDRESS COMPLEMENTED IN BITS 12-14
C
             DO 100 IC=1,NPPW+1
             VAL=AMPL*SIN(PHASE+(IC-1)*2.*PI/PPC)
             ITP=(IC-1)*NELE+(IP*2-1)
             BUFFER(ITP)=IA2D(VAL,10.0)+IADDR
1            CONTINUE
C
C            SEND NASTYGRAM IF TOO BIG
C
             IF (AMPL.GT.10.0) WRITE(6,200)7,IP-1
200          FORMAT(' ',A1,'<<<THE DRIVE TO PROJECTOR',I2,' IS TOO LARGE>>>')
             RETURN
             END

SUBROUTINE SM102 (FREQ,ISW)
C
C            SUBROUTINE TO CONVERT A FREQUENCY IN HZ TO THE
C            CODE FOR A SYNTEST SM-102 FREQUENCY SYNTHESIZER
C            AND OUTPUT IT VIA A DRV-11 INTERFACE.
C
```

```
C       WORDS REQUIRED (BCD DIGITS):
C       IW(1) = (3) (2) (1)
C       IW(2) = (*) (5) (4)
C       * = MULTIPLIER (0-7)
C       (FIVE DIGIT PRECISION)
C
C       ERROR: ISW = -1 FREQUENCY OUT OF RANGE
C
        INTEGER*2 IW(2)
C
        ISW=1
C
C       CHOOSE RANGE
        IF (FREQ.LT.0.1) ISW=-1
        IF (FREQ.GE.0.1) IR=0
        IF (FREQ.GE.1.0) IR=1
        IF (FREQ.GE.10.0) IR=2
        IF (FREQ.GE.100.0) IR=3
        IF (FREQ.GE.1000.0) IR=4
        IF (FREQ.GE.10000.0) IR=5
        IF (FREQ.GE.100000.0) IR=6
        IF (FREQ.GE.1000000.0) IR=7
        IF (FREQ.GT.9999900.0) ISW=-1
C
        IF (ISW.NE.1) RETURN
C
C       SPLIT INTO TWO WORDS
        IEXP=5-IR
        FX=FREQ*(10.**IEXP)
        IW(2)=FX/1000.
        IW(1)=FX-1000.*IW(2)
C
C       CONVERT TO EQUIVALENT BCD
        IA=IW(1)/100
        IB=IW(1)/10-10*IA
        IC=IW(1)-10*IB-100*IA
        IW(1)=IC+16*IB+256*IA
        IA=IW(2)/100
        IB=IW(2)/10-10*IA
        IC=IW(2)-10*IB-100*IA
        IW(2)=IC+16*IB+256*IR
        SET UP THE DRV-11
        CALL SMAC (IW,ISW)
D       WRITE (6,100) IW(1),IW(2)
D100    FORMAT (' DR/SYNTST= '2O8)
C
        RETURN
        END
        SUBROUTINE ZAPC (BUFFER,IR,VCAL,PCAL,RMSV,PHASE,CPHASE)
C
C       SUBROUTINE TO CONVERT THE DMA BUFFER TO VOLTAGE AND PHASE VALUES.
C
        INTEGER BUFFER(1)
        REAL X(500)
C
        COMMON /ZNUM/NPROJ,NRECR,NCYC,NELE,NPPW,PPC
C       NPROJ (NUMBER OF PROJECTORS), NRECR (NUMBER OF RECEIVERS)
C       NCYC (NUMBER OF CYCLES), NPPW (POINTS PER WAVEFORM)
C       NELE (NUMBER OF ELEMENTS = TRANSDUCERS), PPC (POINTS PER CYCLE)
C
        IRA=IAND(BUFFER(2),"170000)/"10000
C       COMPUTE OFFSET
        IROF=2*IR+2*IRA
        IF (IROF.GT.16) IROF=IROF-16
C       FIRST CONVERT THE WAVEFORM TO VOLTS INTO X
C       SKIP FIRST POINT (BAD FOR #4-#7)
        IFLG=0
        XMN=10.0
        XMX=-10.0
        DO 100 I=1,NPPW
        X1=D2A(BUFFER((I-1)*NELE+IROF),10.0)
        XMN=MIN(XMN,X1)
        XMX=MAX(XMX,X1)
        IF (ABS(X1).GT.9.9) IFLG=IFLG+1
100     X(I)=X1/VCAL
C
C       PERFORM A DFT TO GET VOLTAGE AND PHASE
        CALL ZDFT (X,NPPW,NCYC,RMSV,PHASE)
        DBV=20.*ALOG10(RMSV)
C
```

```
C           CORRECT PHASE BY TIME DELAY RELATIVE TO HYDROPHONE #0
            IRD=IR-IRA-1
            IF (IRD.LT.0) IRD=8+IRD
            CPHASE=PHASE-2.0*IRD*360./(PPC*NELE)-PCAL
            CPHASE=PHSET(CPHASE)
C
C           PRINT IF SIGNAL IS TOO SMALL
            IF (XMX-XMN.LT.0.1 .AND. IR-1.EQ.7) WRITE(6,120) 7
120         FORMAT(/' ',A1,'<<<THE SIGNAL FROM THE LINE IS TOO SMALL>>>')
C
C           PRINT IF SIGNAL IS TOO LARGE
            IF (IFLG.GT.1) WRITE(6,150) 7,IR-1
            FORMAT(/' ',A1,'<<<THE SIGNAL FROM RECEIVER',I2,' IS TOO LARGE>>>')
C           PRINT OUT THE MEASURED VALUES
D           WRITE (6,200) IR-1,RMSV,DBV,PHASE,CPHASE
D200        FORMAT (' RECEIVER 'I2': VOLTS='F6.2'; DB='F6.1'; PHASE='
D           1F6.1'; CORRECTED PHASE='F6.1)
C
            RETURN
            END
            SUBROUTINE ZCAL (BUFFER,MBUF,VCAL,PCAL,NM,FREQ,MAXR,SFREQ)
C
C           THIS SUBROUTINE WILL CALIBRATE THE BEAM FORMER
C           HARDWARE DESIGNED BY JOE ZALESAK.
C
            REAL VCAL(1)            !A/D CALIBRATION (LEVEL)
            REAL PCAL(1)            !A/D CALIBRATION (PHASE)
            REAL VCALS(8)           !SUM OF SQUARES OF VCAL
            REAL PCALS(8)           !SUM OF SQUARES OF PCAL
            REAL X(500)                     !HYDROPHONE WAVEFORM
            INTEGER BUFFER (MBUF)   !DMA I/O BUFFER
C
            COMMON /ZNUM/NPROJ,NRECR,NCYC,NELE,NPPW,PPC
C           NPROJ (NUMBER OF PROJECTORS), NRECR (NUMBER OF RECEIVERS)
C           NCYC (NUMBER OF CYCLES), NPPW (POINTS PER WAVEFORM)
C           NELE (NUMBER OF ELEMENTS = TRANSDUCERS), PPC (POINTS PER CYCLE)
C
C           ZERO THE SUMMATION ARRAYS
            DO 100 I=1,MAXR
            VCAL(I)=0.0
            VCALS(I)=0.0
            PCAL(I)=0.0
            PCALS(I)=0.0
            CONTINUE
            VX=1.0
            PX=0.0
C
            WRITE (6,150)
150         FORMAT (/' *** CONFIGURE FOR CALIBRATION ***'/
            1/' OUTPUT OF DRIVE CHANNEL ZERO...'
            2/' THROUGH APPROPRIATE ATTENUATION...'
            3/' TO ALL EIGHT RECEIVE CHANNELS.'/
            4/' RECEIVE INPUT < 30 MILLIVOLTS'
            5/'    FOR HIGH CURRENT, 50 DB ATTENUATION'
            6/'    FOR HIGH VOLTAGE, 70 DB ATTENUATION'/
            7/'$(ENTER "RETURN" WHEN READY)')
C
            READ (5,160) IANS
160         FORMAT (A1)
C
C           MEASURE WITH VOLTMETER
190         CLOSE (UNIT=5)
            WRITE (6,200)
200         FORMAT (//' *** MEASURE OUTPUT OF CHANNEL 0 ***')
            NDMA=30*SFREQ/MBUF          !TIME ON
            IDLY=0
            CALL ADMA (BUFFER,MBUF,NDMA,IDLY,ISW)

WRITE (6,220)
220         FORMAT (/' (ENTER ^Z TO REPEAT)'/
            1'$INPUT VOLTAGE (RMSV)= ')
            READ (5,230,END=190,ERR=210) VOLTS
230         FORMAT (F10.0)
            DEGREE=0.0
C250        WRITE (6,260)
C260        FORMAT ('$INPUT PHASE (DEG)= ')
C           READ (5,230,END=1000,ERR=250) DEGREE
C
```

```
C         DO INTERNAL MEASUREMENT IM TIMES
          DO 300 IM=1,NM
C
          WRITE (6,290) IM
290       FORMAT ('   MEASUREMENT ' I2)
C
C         EXECUTE THE DMA, READING THE HYDROPHONES
          NDMA=10
          IDLY=0
          CALL ADMA (BUFFER,MBUF,NDMA,IDLY,ISW)
C
C         COMPUTE THE AMPLITUDES AND PHASES OF HYDROPHONE OUTPUTS (DFT)
          DO 280 IR=1,MAXR
          IRT=IR
          CALL ZAPC (BUFFER,IRT,VX,PX,RMSV,PHASE,CPHASE)
          IF (IR.EQ.1) XPHASE=CPHASE
          RPHASE=CPHASE-XPHASE
          RPHASE=PHSET(RPHASE)
C
C         PERFORM THE SUMMATIONS
          VCAL(IR)=VCAL(IR)+RMSV
          PCAL(IR)=PCAL(IR)+RPHASE
          VCALS(IR)=VCALS(IR)+RMSV*RMSV
          PCALS(IR)=PCALS(IR)+RPHASE*RPHASE
280       CONTINUE
300       CONTINUE

COMPUTE AVERAGES AND STANDARD DEVIATION
          DO 600 I=1,MAXR
          VAR=VCALS(I)-VCAL(I)*VCAL(I)/NM
          IF (VAR.LT.0.0) VAR=0.0
          VCALS(I)=SQRT(VAR/(NM-1))
          VCAL(I)=(VCAL(I)/NM)/VOLTS
          VAR=PCALS(I)-PCAL(I)*PCAL(I)/NM
          IF (VAR.LT.0.0) VAR=0.0
          PCALS(I)=SQRT(VAR/(NM-1))
          PCAL(I)=DEGREE-PCAL(I)/NM
C
          WRITE (6,590) I-1,VCAL(I),VCALS(I),PCAL(I),PCALS(I)
590       FORMAT (/' HYDROPHONE ' I2,/
         1' VOLTAGE FACTOR = 'F9.5'; DEVIATION = 'F9.5,/
         2'   PHASE FACTOR = 'F9.5'; DEVIATION = 'F9.5)
600       CONTINUE
C
          RETURN
C
1000      CALL QUITS
          END

SUBROUTINE ZCALNM(CALFIL)
C         SUBROUTINE TO NAME THE SYSTEM CALIBRATION FILE.
          BYTE CALFIL(30),TEMP(30)
          WRITE(6,110)CALFIL
110       FORMAT(/,'$SYSTEM CALIBRATION FILENAME:',T32,30A1,T63)
          READ(5,120)ICNT,TEMP
120       FORMAT(Q,30A1)
          IF (ICNT.EQ.0) GOTO 200
          TEMP(ICNT+1)=0
          DO 130 I=1,ICNT+1
130       CALFIL(I)=TEMP(I)
200       CONTINUE
          RETURN
          END
          SUBROUTINE ZDFT (X,N,NCYC,VRMS,PHASE)
C
C         X          ONE-DIMENSIONAL ARRAY FROM WHICH ESTIMATE AMPLITUDE
C                    AND PHASE OF FUNDAMENTAL FOR FOLDED & UNFOLDED LINES.
C         N          NUMBER OF SAMPLES IN THE SEQUENCE X
C         NCYC       SPECTRAL LINE # OF INTEREST (NUMBER OF CYCLES AVAILABLE)
C         VRMS       RMS MAGNITUDE OF THE FUNDAMENTAL
C         PHASE      PHASE ANGLE OF THE FUNDAMENTAL IN DEGREES
C
          REAL X(N)
          DATA PI/3.14159265/
C
C         SINGLE POINT DISCRETE FOURIER TRANSFORM OF A REAL SEQUENCE
C         FOR I=1 TO N:
C         X(NCYC)=(1/N)*SUM <X(I)*EXP(-J*2*PI*(I-1)*NCYC/N)>
C         XR         REAL PART OF X(NCYC)
```

```
C        XI        IMAGINARY PART OF X(NCYC)
C        THE ALGORITHM TAKES ADVANTAGE OF COS(A+B) & SIN(A+B)
C        TO COMPUTE SINES AND COSINES RECURSIVELY
C        THIS IS ESSENTIALLY "GOERTZEL'S ALGORITHM" EXCEPT N CAN BE EVEN

CI=1
         SI=0
         SUMCOS=X(1)
         SUMSIN=0
         CK=COS(2*PI*NCYC/N)
         SK=SIN(2*PI*NCYC/N)
C
         DO 10 I=2,N
         CIPLUS=CK*CI-SK*SI
         SIPLUS=SK*CI+CK*SI
         SUMCOS=SUMCOS+X(I)*CIPLUS
         SUMSIN=SUMSIN+X(I)*SIPLUS
         CI=CIPLUS
         SI=SIPLUS
10       CONTINUE
C
         XR=SUMCOS/N
         XI=-SUMSIN/N
C
         VRMS=SQRT(2*(XR*XR+XI*XI))
         PHASE=ATAN2(XI,XR)*180./3.14159265
C
         RETURN
         END

SUBROUTINE ZDPAR (FREQ,SFREQ,PPC,NPPW,NCYC,NDMA,PDUR)
C
C        SUBROUTINE TO LIST DRIVE PARAMETERS
C
         WRITE (6,100) FREQ,SFREQ/1000.,PPC,NPPW,NCYC,NDMA,PDUR
100      FORMAT (/' DRIVE PARAMETERS:'/
        1' SIGNAL FREQUENCY (HZ)='F9.3,/
        2' SAMPLE FREQUENCY (KHZ)='F8.3,/
        3' NUMBER OF POINTS PER CYCLE= 'F7.3,/
        4' NUMBER OF POINTS PER WAVEFORM= 'I4,/
        5' NUMBER OF CYCLES PER DMA='I6,/
        6' NUMBER OF DMA REQUESTS='I8,/
        7' PULSE DURATION (MSEC)='F9.2,/)
C
         RETURN
         END

SUBROUTINE ZDRIVE (M,P,D,NR,NP,U,W,F,R,S,T,ALPHA,H)
C
C        SUBROUTINE TO COMPUTE THE DRIVE LEVELS FROM
C        A FORMULA THAT IS ALMOST UNTYPEABLE:
C
C        D[NR,1] = INV(A U[NR,NR] + M(*T)[NR,NP] W[NR,NR] F[NR,NR]....
C                  ...M[NP,NR]) M(*T)[NR,NP] W[NR,NR] F[NR,NR] P[NP,1]
C
C        M IS RELATIONAL MATRIX            M[NP,NR]
C        P IS SOUND PRESSURE MATRIX        P[NP,1]
C        D IS DRIVE LEVEL MATRIX           D[NR,1]
C        U IS UNIT MATRIX                  U[NP,NP]
C        F IS DIAGONAL MATRIX 1/P*P        F[NR,NR]
C        H IS HYDROPHONE WEIGHTS           H[NR,1]
C        W IS DIAGONAL WEIGHT MATRIX       W[NR,NR]
C
C        NR IS NUMBER OF HYDROPHONES (ROWS)
C        NP IS NUMBER OF PROJECTORS (COLUMNS)
C
C        T AND S AND R ARE TEMPORARY MATRICES
C
         REAL H(NR)
         COMPLEX M(NR,NP),D(NP,1),P(NR,1),W(NR,NR)
         COMPLEX T(NP,NP),S(NP,NP),R(NP,NP),U(NP,NP),F(NR,NR)
         INTEGER W1(8),W2(8)
         COMPLEX DET,X
C
C        (1) GET COMPLEX CONJUGATE OF M; INTO T
         CALL CMCJ (M,T,NR,NP)
         CALL ZMOUT (T,NR,NP,"103)
C
C        (2) TRANSPOSE M; INTO R
         CALL CMTRA (T,R,NR,NP)
         CALL ZMOUT (R,NP,NR,"124)
C
```

```
C           (3) MULTIPLY BY WF; INTO S AND *** SAVE ***
C               PREPARE THE F AND W MATRICES
C               THE DIAGONALS ARE 1/(P(I)P(I)*) AND H(I)
            DO 50 I=1,NR
            DO 50 J=1,NR
            W(I,J)=0.0
50          F(I,J)=0.0
            DO 51 I=1,NR
            W(I,I)=H(I)
            X=P(I,1)
            X=1/(X*CONJG(X))
51          F(I,I)=X
C           CALL ZMOUT (W,NR,NR,'H')
C           CALL ZMOUT (F,NR,NR,'106)
C           MULTIPLY W BY F, RESULT IN U
            CALL CMPRD (W,F,U,NR,NR,NR)
C           CALL ZMOUT (U,NR,NR,'U')
C           MULTIPLY R BY U, RESULT IN S
            CALL CMPRD (R,U,S,NP,NR,NR)
            CALL ZMOUT (S,NP,NR,'106)
C
C
C           (4) MULTIPLY BY M; INTO R
            CALL CMPRD (S,M,R,NP,NR,NP)
C           CALL ZMOUT (R,NP,NP,'115)
C
C
C           (5) ADD UNIT MATRIX; INTO R
C               PREPARE THE UNIT MATRIX
            IF (ALPHA.LT.0) ALPHA=R(1,1)/100000.
            DO 100 I=1,NP
            DO 100 J=1,NP
100         U(I,J)=0.0
            DO 101 I=1,NP
            X=CMPLX(ALPHA,0.0)
101         U(I,I)=X
C           CALL ZMOUT (U,NP,NP,'125)
C
            CALL CMADD (R,U,R,NP,NP)
            CALL ZMOUT (R,NP,NP,'123)
C
C
C           (6) INVERT MATRIX; REPLACE R
            CALL CMINV (R,NP,DET,W1,W2)
            CALL ZMOUT (R,NP,NP,'111)
C
C
C           (7) MULTIPLY BY S; INTO U
            CALL CMPRD (R,S,U,NP,NP,NR)
            CALL ZMOUT (U,NP,NR,'120)
C
C
C           (8) MULTIPLY BY P; INTO D
            CALL CMPRD (U,P,D,NP,NR,1)
D           CALL ZMOUT (D,NP,1,'104)
C
            CONGRATULATIONS; DONE!!!
            RETURN
C
            END

SUBROUTINE ZERALL (BUFFER,MBUF,MAXP)
C
C           SUBROUTINE TO ZERO ALL PROJECTOR OUTPUT BUFFERS.
C
            INTEGER BUFFER (MBUF)
C
            COMMON /ZNUM/NPROJ,NRECR,NCYC,NELE,NPPW,PPC
C           NPROJ (NUMBER OF PROJECTORS), NRECR (NUMBER OF RECEIVERS)
C           NCYC (NUMBER OF CYCLES), NPPW (POINTS PER WAVEFORM)
C           NELE (NUMBER OF ELEMENTS = TRANSDUCERS), PPC (POINTS PER CYCLE)
C
C           LOAD ALL PROJECTORS WITH ZERO (PLUS ADDRESS)
C
            DO 100 J=1,MAXP              !EACH PROJECTOR
            IADDR=(8-J)*4096             !ADDRESS IN UPPER BITS
            DO 100 I=1,NPPW+1            !ENTIRE WAVEFORM
            ITP=(I-1)*NELE+2*J-1
            BUFFER(ITP)=IADDR+"3777
100         CONTINUE
C
            RETURN
            END
```

```
      SUBROUTINE ZMOUT (X,NR,NP,IC)
C
C     SUBROUTINE TO OUTPUT A COMPLEX MATRIX
C
      BYTE TEXT(132)
      COMPLEX X(NR,NP),Z
C
      WRITE (6,100) IC
100   FORMAT (' COMPLEX MATRIX 'A1)
C
      NL=5
      IF (NP.LE.5) NL=NP
      DO 200 I=1,NR
C
      DO 150 J=1,NL
      Z=X(I,J)
      XR=REAL(Z)
      XI=AIMAG(Z)
      ENCODE (11,300,TEXT((J-1)*25+4)) XR
      ENCODE (11,300,TEXT((J-1)*25+16)) XI
      TEXT((J-1)*25+15)=44
150   CONTINUE
C
      NBYTES=25*NL+2
      WRITE (6,160) (TEXT(K),K=1,NBYTES)
160   FORMAT (' '132A1)
C
      IF (NL.EQ.NP) GOTO 200
C
      DO 170 K=3,28
170   TEXT(K)=32
      DO 180 K=NL+1,NP
      J=K-5
      Z=X(I,K)
      XR=REAL(Z)
      XI=AIMAG(Z)
      ENCODE (11,300,TEXT(J*25+4)) XR
      ENCODE (11,300,TEXT(J*25+16)) XI
      TEXT(J*25+15)=44
180   CONTINUE
C
      NBYTES=25*(NP-5)+27
      WRITE (6,160) (TEXT(K),K=1,NBYTES)
C
200   CONTINUE
C
300   FORMAT (E11.4)

RETURN
      END

SUBROUTINE ZNHYD (CALFIL,MAXR,NRECR,HCAL,ESP
     1,VCAL,PCAL,HW)
C
C     SUBROUTINE TO ENTER THE HYDROPHONE CALIBRATIONS AND
C     THE ELEMENT SPACINGS.
C
      REAL HCAL(8),ESP(8),VCAL(8),PCAL(8)
      REAL HW(8)
      BYTE NZT(2),CALFIL(30)
C
      CALL ZCALNM(CALFIL)
      IANS='Y '
      CALL ZNREST(CALFIL,MAXR,HCAL,ESP
     1,VCAL,PCAL,HW,ISW,IANS)
      IF (ISW.NE.1) GOTO 30
10    WRITE (6,20)
20    FORMAT ('$ENTER NEW HYDROPHONE PARAMETERS (Y:L:N)? ')
      READ (5,25,END=900) IANS
25    FORMAT (A1)
      IF (IANS.EQ.'Y ') GOTO 45
      IF (IANS.EQ.'L ') GOTO 1000
      RETURN

30    WRITE (6,35)
35    FORMAT (' FILE "ZHYD.CAL" NOT AVAILABLE')
C
45    WRITE (6,50)
50    FORMAT (/' ENTER HYDROPHONE CALIBRATIONS')
C
```

```
              DO 100 I=1,NRECR
              ENCODE (2,80,NZT(1)) I-1
80            FORMAT (I2)
              IF (NZT(1).EQ."40) NZT(1)="60
85            WRITE (6,90) NZT
90            FORMAT (' HYDROPHONE '2A1' (DB):')
              CALL RENT(HCAL(I))
100           CONTINUE
C
140           CLOSE (UNIT=5)
              WRITE (6,150)
150           FORMAT (/' ENTER DISTANCES FROM ORIGIN')
C
              DO 200 I=1,NRECR
              ENCODE (2,80,NZT(1)) I-1
              IF (NZT(1).EQ."40) NZT(1)="60
              WRITE (6,160) NZT
              FORMAT (' DISTANCE FOR HYDROPHONE '2A1' (MD:')
              CALL RENT(ESP(I))
200           CONTINUE
C
210           CLOSE (UNIT=5)
              WRITE (6,220)
220           FORMAT (/' ENTER HYDROPHONE WEIGHTS: ')
              DO 300 I=1,NRECR
              ENCODE (2,80,NZT(1)) I-1
              IF (NZT(1).EQ."40) NZT(1)="60
225           WRITE (6,230) NZT
230           FORMAT (' WEIGHT FOR HYDROPHONE '2A1' : ')
              CALL RENT(HW(I))
300           CONTINUE
C
C
340           CLOSE (UNIT=5)
              WRITE(6,342)
342           FORMAT(/'$DO YOU WANT TO ENTER SYSTEM CALIBRATIONS (Y:N)?')
              READ (5,25,END=900) IANS
              IF (IANS.NE.'Y ') GOTO 580
              WRITE (6,350)
350           FORMAT (/' ENTER SYSTEM CALIBRATIONS')
              DO 400 I=1,8
              ENCODE (2,80,NZT(1)) I-1
              IF (NZT(1).EQ."40) NZT(1)="60
355           WRITE (6,360) NZT
360           FORMAT (' CHANNEL '2A1' VOLTAGE FACTOR:')
              CALL RENT(VCAL(I))
400           CONTINUE
C
440           CLOSE (UNIT=5)
              WRITE (6,450)
450           FORMAT (/' ENTER PHASE CORRECTIONS')
              DO 500 I=1,8
              ENCODE (2,80,NZT(1)) I-1
              IF (NZT(1).EQ."40) NZT(1)="60
455           WRITE (6,460) NZT
460           FORMAT (' CHANNEL '2A1' PHASE OFFSET: (DEG)')
              CALL RENT(PCAL(I))
              CONTINUE
C
580           CLOSE (UNIT=5)
              WRITE (6,600)
600           FORMAT (/'$SAVE NEW CALIBRATION FILE (Y:N)? ')
              READ (5,25,END=900) IANS
              IF (IANS.NE.'Y ') RETURN
C
              CALL ZCALNM(CALFIL)
              CALL ZNSAVE(CALFIL,MAXR,HCAL,ESP,VCAL,PCAL,FREQ,HW)
              RETURN
C
C             ONE ^Z CAUSES EXIT.
900           CALL QUITS
C
C             RESTORE CALIBRATIONS FROM A FILE
1000          CALL ZNREST(CALFIL,MAXR,HCAL,ESP
             1,VCAL,PCAL,HW,ISW,IANS)
              IF (ISW.NE.1) GOTO 30
              RETURN
C
              END
```

```
      SUBROUTINE ZNOISE (BUFFER,MBUF,NM,FREQ,MAXR)
C
C     THIS SUBROUTINE WILL COMPUTE SIGNAL TO NOISE RATIOS.
C
      REAL VS(8),VSS(8)      !SIGNAL ARRAYS
      REAL VN(8),VNS(8)      !NOISE ARRAYS
      REAL X(500)                    !HYDROPHONE WAVEFORM
      INTEGER BUFFER (MBUF)  !DMA I/O BUFFER
C
      COMMON /ZNUM/NPROJ,NRECR,NCYC,NELE,NPPW,PPC
C     NPROJ (NUMBER OF PROJECTORS), NRECR (NUMBER OF RECEIVERS)
C     NCYC (NUMBER OF CYCLES), NPPW (POINTS PER WAVEFORM)
C     NELE (NUMBER OF ELEMENTS = TRANSDUCERS), PPC (POINTS PER CYCLE)
C
C     ZERO THE SUMMATION ARRAYS
      DO 100 I=1,MAXR
      VS(I)=0.0
      VSS(I)=0.0
      VN(I)=0.0
      VNS(I)=0.0
      CONTINUE
      VX=1.0
      PX=0.0
C
      WRITE (6,250)
250   FORMAT (//' *** RESTORE NORMAL MEASUREMENT CONFIGURATION ***'///
     1' MEASURE THE NORMAL SIGNAL LEVEL'/
     2'$(ENTER "RETURN" WHEN READY)')
      READ (5,255,END=1000) IANS
255   FORMAT (A1)
C     DO INTERNAL SIGNAL MEASUREMENT IM TIMES
      DO 300 IM=1,NM
      WRITE (6,290) IM
290   FORMAT ('    SIGNAL MEASUREMENT ' I2)
C     EXECUTE THE DMA, READING THE HYDROPHONES
      NDMA=10
      IDLY=0
      CALL ADMA (BUFFER,MBUF,NDMA,IDLY,ISW)
C     COMPUTE THE AMPLITUDES AND PHASES OF HYDROPHONE OUTPUTS (DFT)
      DO 280 IR=1,MAXR
      IRT=IR
      CALL ZAPC (BUFFER,IRT,VX,PX,RMSV,PHASE,CPHASE)
C     PERFORM THE SUMMATIONS
      VS(IR)=VS(IR)+RMSV
      VSS(IR)=VSS(IR)+RMSV*RMSV
      CONTINUE
      CONTINUE
C
C     COMPUTE AVERAGES AND STANDARD DEVIATION
      DO 310 I=1,MAXR
      VAR=VSS(I)-VS(I)*VS(I)/NM
      IF (VAR.LT.0.0) VAR=0.0
      VSS(I)=SQRT(VAR/(NM-1))
      VS(I)=(VS(I)/NM)
310   CONTINUE
C
      WRITE (6,450)
450   FORMAT (' MEASURE THE NOISE LEVEL'/
     1' REMOVE DRIVE TO PROJECTORS'/
     2' (ENTER "RETURN" WHEN READY)')
      READ (5,255,END=1000) IANS
C     DO INTERNAL SIGNAL MEASUREMENT IM TIMES
      DO 500 IM=1,NM
      WRITE (6,490) IM
490   FORMAT ('    NOISE MEASUREMENT ' I2)
C     EXECUTE THE DMA, READING THE HYDROPHONES
      NDMA=10
      IDLY=0
      CALL ADMA (BUFFER,MBUF,NDMA,IDLY,ISW)
C     COMPUTE THE AMPLITUDES AND PHASES OF HYDROPHONE OUTPUTS (DFT)
      DO 480 IR=1,MAXR
      IRT=IR
      CALL ZAPC (BUFFER,IRT,VX,PX,RMSV,PHASE,CPHASE)
C     PERFORM THE SUMMATIONS
      VN(IR)=VN(IR)+RMSV
      VNS(IR)=VNS(IR)+RMSV*RMSV
480   CONTINUE
500   CONTINUE
C
```

```
C       COMPUTE AVERAGES AND STANDARD DEVIATION
        DO 510 I=1,MAXR
        VAR=VNS(I)-VN(I)*VN(I)/NM
        IF (VAR.LT.0.0) VAR=0.0
        VNS(I)=SQRT(VAR/(NM-1))
        VN(I)=(VN(I)/NM)
510     CONTINUE

WRITE (6,600)
        FORMAT (//,14X'SIGNAL'23X'NOISE'12X'S/N RATIO')
        WRITE (6,610)
610     FORMAT (' NO    VOLTS    DEV    DB        VOLTS    DEV    DB
       1    DB')
        DO 700 I=1,MAXR
        VSDB=20.*ALOG10(VS(I))
        VNDB=20.*ALOG10(VNS(I))
        SIG=VS(I)-VN(I)
        IF (SIG.GT.0) SNR=20.*ALOG10(SIG/VN(I))
        IF (SIG.LE.0) SNR=0
        WRITE (6,710) I-1,VS(I),VSS(I),VSDB,VN(I),VNS(I),VNDB,SNR
710     FORMAT (' 'I2,F8.3,F8.3,F8.1,5X,F8.3,F8.3,F8.1,5X,F5.1)
700     CONTINUE
        RETURN
C
1000    CALL QUITS
        END

SUBROUTINE ZNREST (CALFIL,NRECR,HCAL,ESP
       1,VCAL,PCAL,HW,ISW,IANS)
C
C       SUBROUTINE TO RESTORE THE CALIBRATIONS OF THE SYSTEM
C
        BYTE LINE(132),CALFIL(30)
        REAL HCAL(NRECR),ESP(NRECR),VCAL(NRECR),PCAL(NRECR)
        REAL HW(NRECR)
C
C       READ THESE CALIBRATIONS FROM A FILE
1000    OPEN (UNIT=1,NAME=CALFIL,TYPE='OLD',FORM='FORMATTED',
       1READONLY,ERR=2000)
        READ (1,1010,END=2000,ERR=2000) LEN,LINE
1010    FORMAT (Q,132A1)
        IF (IANS.EQ.'L') WRITE (6,1020) (LINE(J),J=1,LEN)
1020    FORMAT (/' '132A1)
        DO 1050 I=1,NRECR
        READ(1,1030,END=2000,ERR=2000)J,FREQ,HCAL(I),ESP(I),HW(I)
       1,VCAL(I),PCAL(I)
1030    FORMAT(I4,6F11.4)
        IF (IANS.EQ.'L') WRITE (6,1040) J,FREQ,HCAL(I),ESP(I),HW(I)
       1,VCAL(I),PCAL(I)
        FORMAT (I4,6F11.4)
1050    CONTINUE
        CLOSE (UNIT=1)
        WRITE (6,1060)
1060    FORMAT (' ')
        ISW=1
        RETURN
C
2000    ISW=-1
        CLOSE (UNIT=1)
        RETURN
        END

SUBROUTINE ZNSAVE (CALFIL,MAXR,HCAL,ESP
       1,VCAL,PCAL,FREQ,HW)
C
C       SUBROUTINE TO SAVE (CREATE) A CALIBRATION FILE
C
        BYTE CALFIL(30)
        REAL HCAL(MAXR),ESP(MAXR),VCAL(MAXR),PCAL(MAXR)
        REAL HW(MAXR)
C
        OPEN (UNIT=1,NAME=CALFIL,TYPE='NEW',FORM='FORMATTED',
       1CARRIAGECONTROL='LIST',ERR=200)
C
        WRITE (1,100)
100     FORMAT (' NO    FREQ(HZ)  HYD-CAL(DB)  HYD-DIST(M)  HYD-WGHT
       1  VOLT-CAL(V)  PHASE(DEG)')
        DO 120 I=1,MAXR
        WRITE (1,110) I-1,FREQ,HCAL(I),ESP(I),HW(I),VCAL(I),PCAL(I)
```

```
110     FORMAT (I4,6F11.4)
120     CONTINUE
        CLOSE (UNIT=1)
C
        RETURN
        END

SUBROUTINE QUITS
C
C       SUBROUTINE FOR CLEAN EXITING
        WRITE (6,100)
100     FORMAT (//' BEAMER EXIT')
        CALL EXIT
        END

.TITLE  ADMA
        ;CALL ADMA (BUFFER,COUNT,ITER,IDLY,ISW)

;SUBROUTINE TO TRANSFER COUNT WORDS INTO BUFFER (DMA)
        ;AND DO IT ITER TIMES POST-HASTE
        ;SKIPPING IDLY WORDS ON SUBSEQUENT TRIES

;DRWCR=772410   ;DRV-11B WORD COUNTER
        ;DRBAR=772412   ;BUFFER ADDRESS REGISTER
        ;DRCSR=772414   ;CONTROL STATUS REGISTER
        ;DRVID=772416   ;WORD I/O REGISTER

;REGISTER USAGE DEFINED:
        ;(ATTEMPT TO REINITIATE DMA AS FAST AS POSSIBLE)
                ;R1 = ERROR NUMBER
                ;R2 = DRCSR WORD
                ;R3 = LOAD ADDRESS
                ;R4 = WORD COUNT COMPLEMENT

;DRV-11B STATUS BITS---
                ;BIT 0      = 1   :GO!
                ;BIT 1-3          :USER DEVICE FUNCTIONS
                ;BIT 4-5          :EXTENDED ADDRESS BITS
                ;BIT 6      = 0   :ENABLE INTERRUPT
                ;BIT 7            :READY BIT
                ;BIT 8            :IMMEDIATE CYCLE BIT
                ;BIT 9-11         :USER DEVICE STATUS
                ;BIT 12           :MAINTENANCE BIT
                ;BIT 13           :ERROR: ATTENTION BIT
                ;BIT 14           :ERROR: NON-EXISTENT MEMORY
                ;BIT 15           :ERROR: ANY

;ISW IS STATUS WORD:
                ; -3 DISABLE CHECKPOINTING FAILURE
                ; -4 ENABLE CHECKPOINTING FAILURE
                ; -5 GET REGION DIRECTIVE FAILURE

.MCALL  DSCP$S,ENCP$S,GREG$C,WSIG$S

ADMA::
        MOV     #-3,R1
        DSCP$S  IERR                    ;DISABLE CHECKPOINTING

MOV     #-5,R1
        GREG$C  0,RPAR                  ;GET REGION PARAMETERS
        BCS     IERR                    ;ERROR IF CARRY IS SET
        MOV     @#RPAR,R0               ;GET PHYSICAL ADDRESS (/32.) OF TASK
        CLC
        MOV     2(R5),R2                ;GET VIRTUAL ADDRESS OF BUFFER
        BIC     #77,R2
        ASH     #-6,R2                  ;CONVERT TO /32. FORM
        ADD     R2,R0                   ;R0 NOW HAS PHYSICAL ADDRESS OF BUFFER/32.
        BIC     #171777,R0              ;ELIMINATE ALL BUT ADDRESS BITS 18-17
        ASH     #-6,R0                  ;SHIFT INTO BITS 6-5 FOR....
        MOV     R0,R2                   ;LOADING IN DMA STATUS REGISTER
        MOV     @#RPAR,R0               ;GET PHYSICAL ADDRESS OF
        ASH     #6,R0                   ;TASK (MULTIPLY BY 32. WORDS)
        BIC     #77,R0                  ;ELIMINATE EXTENDED ADDRESS BITS
        ADD     2(R5),R0                ;ADD ADDRESS OFFSET FOR BUFFER
        MOV     R0,R3                   ;AND LOAD IN "ADDRESS REGISTER"
        CCC

MOV     64(R5),R4               ;GET NUMBER OF WORDS INTO REGISTER
        NEG     R4                      ;AND TWO'S COMPLEMENT IT
```

```
            MOV     @6(R5),LOOP         ;SAVE ITERATION COUNTER

MOV     R4,@#DRWCR          ;SETUP WORD COUNT
            MOV     R3,@#DRBAR          ;SETUP ADDRESS
                                        ;GLITCH CATCHER FOR NON-FIRST DMA'S:
            NOP
            ADD     @10(R5),R4          ;SEND IDLY LESS POINTS (ADD TO COMPLEMENT)
            ADD     @10(R5),R3          ;STARTING IDLY POINTS INTO PULSE
            ADD     @10(R5),R3          ;(REMEMBERING THIS IS BYTE ADDRESS)
            BIS     #000001,R2          ;SET GO BIT IN REGISTER 2

BIC     #100,@#LKS
DG0:        MFPS    R1                  ;SAVE CURRENT PSW
            MTPS    #340                ;DISABLE ALL INTERRUPTS (CLOCK!)
            MOV     R2,@#DRCSR          ;INITIATE DMA TRANSFER!
AGIN:       DEC     LOOP                ;BUMP LOOP COUNTER
            TST     LOOP                ;TEST FOR DONE?
            BLE     DONE                ;NO MORE LOOPS
WDUN:       TSTB    @#DRCSR             ;TEST "READY" LINE
            BGE     WDUN                ;LOOP UNTIL SET
            MOV     R3,@#DRBAR          ;SETUP ADDRESS
            MOV     R4,@#DRWCR          ;SETUP WORD COUNT
            MOV     R2,@#DRCSR          ;TELL TO GO AGAIN!
            JMP     AGIN                ;CHECK ITERATION COUNTER AGAIN
DONE:       TSTB    @#DRCSR             ;TEST "READY" LINE ON LAST ITERATION
            BGE     DONE                ;WAIT FOR END OF DATA
            MTPS    R1                  ;RESTORE ORIGINAL PSW
            BIS     #100,@#LKS

MOV     #-4,R1
            ENCP$S  IERR                ;ENABLE CHECKPOINTING

MOV     #1,R1               ;STATUS = OKAY
                                        ;NORMAL EXIT OR...

IERR:       MOV     R1,@12(R5)          ;PARAMETER ERROR
            RTS     PC

LOOP:       .WORD   0000
RPAR:       .WORD   0                   ;REGION PARAMETERS: PHYSICAL ADDRESS/100
            .BLKW   2                   ;REGION PARAMETERS: IRRELEVANT

.END

.TITLE  SMAC

;CALL SMAC (ID,ISW)
            ;SUBROUTINE TO OUTPUT DATA IN ID(2) TO A DRV-11
            ;INTERFACE ATTACHED TO A SYNTEST SM-102 SYNTHESIZER.

;DROUT=167772

SMAC::      MOV     2(R5),R0            ;ADDRESS OF ARRAY

;STEP ONE: DISABLE SYNTHESIZER
            MOV     #060000,@#DROUT
            JSR     PC,WAIT

;STEP TWO: LOAD THREE LSDIGITS
            MOV     (R0),R1
            BIS     #060000,R1
            MOV     R1,@#DROUT
            JSR     PC,WAIT
            BIC     #020000,@#DROUT
            JSR     PC,WAIT
            BIS     #020000,@#DROUT
            JSR     PC,WAIT

;STEP THREE: LOAD TWO MSDIGITS AND MULTIPLIER
            MOV     2(R0),R1
            BIS     #060000,R1
            MOV     R1,@#DROUT
            JSR     PC,WAIT
            BIC     #040000,@#DROUT
            JSR     PC,WAIT
            BIS     #040000,@#DROUT
            JSR     PC,WAIT
```

```
;STEP FOUR: ENABLE SYNTHESIZER
        MOV     #160000,@#DROUT
        JSR     PC,WAIT

;SIGNIFY SUCCESS
        MOV     #1,@4(R5)
        RTS     PC

;DELAY ROUTINE (1 MSEC APPROX)
WAIT:   MOV     #125.,TEMP
ICS:    DEC     TEMP
        BGT     ICS
        RTS     PC
        .WORD   0

.END
```

What is claimed and desired to be secured by Letters Patent of the United States is:

1. A calibrator for calibrating a hydrophone array comprising:

a calibration chamber for sealing the array therein, said chamber being filled with a selected fluid;

a plurality of projectors, disposed relative to said chamber, for generating acoustic waves within said chamber, wherein a jth projector generates a jth acoustic wave, where j is a positive integer less than or equal to the number of projectors;

a plurality of monitors, disposed relative to said chamber, for generating a monitor output signal in response to an incident acoustic wave, wherein an ith monitor generates an ith monitor output signal, where i is a positive integer less than or equal to the number of monitors;

a plurality of digital-to-analog (D/A) channels for generating a driving voltage signal with amplitude and phase in accordance with a projector digital signal received by said D/A channel, wherein a jth D/A channel is connected to said jth projector and wherein the complex amplitude of the driving voltage signal generated by said jth D/A channel is $V_j$;

a plurality of monitor analog-to-digital (A/D) channels for encoding the amplitude and phase of said monitor output signal into a monitor digital signal, wherein an ith A/D channel is connected to said ith monitor;

an array A/D channel for encoding the amplitude and phase of the output signal of the array under test into an array digital signal;

digital computer means wherein the inputs to said digital computer means are said monitor digital signals and said array digital signal and the outputs from said digital computer means are said projector digital signals, said digital computer for calculating a set of $V_j$s so that a calibration wave, with a predetermined amplitude and phase relative to the center of the array, corresponding to a free plane wave incident on the array at any arbitrary angle $\theta$ is generated in said chamber, for encoding said set of $V_j$s to said jth D/A channel and for storing said array digital signal resulting from said calibration wave.

2. The calibrator recited in claim 1 wherein said digital computer means comprises:

an interface and control circuit for interconnecting said digital computer means with said A/D channels, said monitor D/A channels and said array A/D channel.

3. The calibrator recited in claim 1 wherein: said calibration chamber is a high pressure pipe closed at both ends.

4. The calibration chamber recited in claim 3 wherein: said monitors and said projectors are piezoelectric transducers.

5. The calibration chamber recited in claim 4 wherein: said monitors and said projectors are mounted on a support structure positioned within said calibration chamber.

6. A calibrator for calibrating a hydrophone array comprising:

a calibration chamber for sealing the array therein, said chamber being filled with a selected fluid;

a plurality of projectors, disposed relative to said chamber, for generating acoustic waves within said chamber, wherein a jth projector generates a jth acoustic wave, where j is a positive integer less than or equal to the number of projectors;

a plurality of monitors, disposed relative to said chamber, for generating a monitor output signal in response to an incident acoustic wave, wherein an ith monitor generates an ith monitor output signal, where i is a positive integer less than or equal to the number of monitors;

a plurality of drivers for generating a driving voltage signal, wherein a jth driver is connected to said jth projector wherein the complex amplitude of the driving voltage signal generated by said jth driver is $V_j$ and wherein $V_j$ is adjustable; and a plurality of indicators for measuring the amplitude and phase of said monitor output signals wherein a jth indicator is connected to said jth monitor.

7. The calibrator recited in claim 6 wherein: said calibration chamber is a high pressure pipe closed at both ends.

8. The calibration chamber recited in claim 7 wherein: said monitors and said projectors are piezoelectric transducers.

9. The calibration chamber recited in claim 8 wherein: said monitors and said projectors are mounted on a support structure positioned within said calibration chamber.

* * * * *